US012367763B2

(12) United States Patent
Nakashima et al.

(10) Patent No.: US 12,367,763 B2
(45) Date of Patent: Jul. 22, 2025

(54) TRAFFIC FACILITY CONTROL SYSTEM, TRAFFIC FACILITY CONTROL METHOD, AND PROGRAM

(71) Applicant: TOYOTA JIDOSHA KABUSHIKI KAISHA, Aichi-ken (JP)

(72) Inventors: Issei Nakashima, Tokyo-to (JP); Toru Miyagawa, Seto (JP); Hideo Hasegawa, Nagoya (JP); Yusuke Kinoshita, Tokyo-to (JP); Bing Xue, Tokyo-to (JP); Yuta Mori, Urayasu (JP); Takashi Homma, Tokyo-to (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 37 days.

(21) Appl. No.: 18/340,029

(22) Filed: Jun. 23, 2023

(65) Prior Publication Data

US 2023/0419826 A1    Dec. 28, 2023

(30) Foreign Application Priority Data

Jun. 24, 2022 (JP) ................................. 2022-101560

(51) Int. Cl.
*G08G 1/07* (2006.01)
*G06T 7/20* (2017.01)
*G06V 40/16* (2022.01)

(52) U.S. Cl.
CPC ................. *G08G 1/07* (2013.01); *G06T 7/20* (2013.01); *G06V 40/172* (2022.01)

(58) Field of Classification Search
None
See application file for complete search history.

(56) References Cited

U.S. PATENT DOCUMENTS

| 6,075,454 | A  | * | 6/2000  | Yamasaki   | G07C 9/00309 |
|           |    |   |         |            | 340/5.72     |
| 6,304,178 | B1 | * | 10/2001 | Hayashida  | E05F 15/43   |
|           |    |   |         |            | 340/552      |
| 7,109,677 | B1 | * | 9/2006  | Gagnon     | E05F 15/43   |
|           |    |   |         |            | 49/27        |
| 9,300,925 | B1 | * | 3/2016  | Zhang      | G06V 20/52   |
| 9,846,999 | B1 | * | 12/2017 | Pickover   | H04M 1/72403 |
| 10,255,733| B2 | * | 4/2019  | Zavesky    | A61B 5/082   |

(Continued)

FOREIGN PATENT DOCUMENTS

| JP | 2000-090391 A | 3/2000 |
| JP | 3530090 B2    | 5/2004 |

(Continued)

*Primary Examiner* — Carlos Garcia
(74) *Attorney, Agent, or Firm* — HAUPTMAN HAM, LLP

(57) ABSTRACT

Provided is a traffic facility control system capable of achieving both ensuring of physical safety of a moving person and reduction of a psychological burden on the moving person. The traffic facility control system according to the present disclosure includes: a detection unit configured to detect a moving ability of a person; a determination unit configured to determine a psychological state of the person; and a control unit configured to control a traffic facility installed at at least one of the vicinity of a current position of the person, a position on a route along which the person moves, or a position along the route based on the moving ability of the person and the psychological state of the person.

20 Claims, 14 Drawing Sheets

(56) References Cited

U.S. PATENT DOCUMENTS

| | | | | |
|---|---|---|---|---|
| 10,535,208 | B2* | 1/2020 | Zavesky | A61B 5/1113 |
| 10,682,097 | B2* | 6/2020 | Bruno | G08B 21/0423 |
| 10,783,727 | B2* | 9/2020 | Zavesky | A61B 5/082 |
| 11,688,219 | B2* | 6/2023 | Martin | G06F 21/35 |
| | | | | 340/5.61 |
| 11,928,894 | B2* | 3/2024 | Wu | G06V 40/25 |
| 2015/0061825 | A1* | 3/2015 | Suzuki | H04W 4/21 |
| | | | | 340/5.52 |
| 2016/0370188 | A1* | 12/2016 | Matsushita | G01C 21/206 |
| 2018/0174457 | A1* | 6/2018 | Taylor | G06N 3/045 |
| 2018/0176168 | A1* | 6/2018 | Tsou | G06F 21/6245 |
| 2019/0057561 | A1* | 2/2019 | Zavesky | A61B 5/4833 |
| 2019/0080055 | A1* | 3/2019 | Bettencourt Da Silva | |
| | | | | G16H 20/30 |
| 2020/0143663 | A1* | 5/2020 | Sol | G07C 9/00174 |
| 2020/0176018 | A1* | 6/2020 | Feinauer | G10L 25/63 |
| 2020/0408545 | A1* | 12/2020 | Gordon | G01C 21/3438 |
| 2021/0065538 | A1 | 3/2021 | Tamura et al. | |
| 2021/0085246 | A1 | 3/2021 | Yoon et al. | |
| 2021/0287469 | A1* | 9/2021 | Ryhorchuk | G06V 40/172 |
| 2023/0028562 | A1* | 1/2023 | Papon | G06T 7/73 |
| 2023/0252315 | A1* | 8/2023 | Griffin | G06N 3/08 |
| | | | | 706/12 |
| 2023/0419826 | A1* | 12/2023 | Nakashima | G08G 1/005 |
| 2024/0029109 | A1* | 1/2024 | Hashimoto | G06Q 30/0261 |

FOREIGN PATENT DOCUMENTS

| | | |
|---|---|---|
| JP | 2007-264778 A | 10/2007 |
| JP | 2021-030901 A | 3/2021 |
| JP | 2021-154152 A | 10/2021 |

\* cited by examiner

| FACILITY ID | FACILITY TYPE | CONDITION A | CONDITION B | CONDITION C | CONDITION D | CONDITION E | ... |
|---|---|---|---|---|---|---|---|
| 20a | TRAFFIC LIGHT | GREEN | RED | — | — | — | .. |
| 20c | CROSSWALK TRAFFIC LIGHT | GREEN | RED | — | — | — | .. |
| 20j | LIFTING TYPE STRIP | LOWERED | LIFTED | — | — | — | .. |
| 20v | LIFTING TYPE BRAILLE BLOCK | — | — | LIFTED | — | — | .. |
| 20p | DIGITAL SIGNAGE | FACILITY CONTROL CONTENT | NORMAL CONTENT | NORMAL CONTENT | NORMAL CONTENT | NORMAL CONTENT | .. |
| 20x | LIFTING TYPE GUARD RAIL | — | — | — | — | LIFTED | .. |
| 20w | VARIABLE SIGN | — | — | — | — | DISPLAYING PROHIBITION OF PASSING OF BICYCLE | .. |
| 20d | TRAFFIC LIGHT | RED | GREEN | — | — | — | .. |
| .. | .. | .. | .. | .. | .. | .. | .. |

| USER ID | MOBILE ABILITY MODEL ID | PSYCHOLOGICAL STATE MODEL ID | DISEASE INFORMATION |
|---|---|---|---|
| 1 | 10 | 9 | : |
| 2 | 1 | 1 | : |
| 3 | 4 | 3 | : |
| 4 | 15 | 10 | : |
| : | : | : | : |

Fig. 9

| DATA No. | EXPLANATORY VARIABLE | | OBJECTIVE VARIABLE |
|---|---|---|---|
| | MOVABLE RANGE INFORMATION | WALKING SPEED INFORMATION | MOVING ABILITY |
| 1 | : | : | HIGH |
| 2 | : | : | NORMAL |
| 3 | : | : | LOW |
| ⋮ | ⋮ | ⋮ | ⋮ |

Fig. 12

| DATA No. | EXPLANATORY VARIABLE | | OBJECTIVE VARIABLE |
|---|---|---|---|
| | PULSE RATE INFORMATION | BODY TEMPERATURE INFORMATION | PSYCHOLOGICAL STATE |
| 1 | : | : | GOOD |
| 2 | : | : | NORMAL |
| 3 | : | : | BAD |
| ⋮ | ⋮ | ⋮ | ⋮ |

Fig. 13

TRAFFIC FACILITY CONTROL SYSTEM, TRAFFIC FACILITY CONTROL METHOD, AND PROGRAM

CROSS REFERENCE TO RELATED APPLICATIONS

This application is based upon and claims the benefit of priority from Japanese patent application No. 2022-101560, filed on Jun. 24, 2022, the disclosure of which is incorporated herein in its entirety by reference.

BACKGROUND

The present disclosure relates to a traffic facility control system, a traffic facility control method, and a program.

Japanese Patent No. 3530090 describes a technology of statistically calculating a required crossing time for a crosswalk for each attribute from pedestrian information received from a transmitter attached to each pedestrian, and determining an extension time of a green phase of a traffic light based on a result of the statistical calculation.

SUMMARY

However, in the technology described in Japanese Patent No. 3530090, the green phase of the traffic light is set to a time required for a pedestrian to cross the crosswalk, so that safety of the pedestrian at the time of crossing the crosswalk is enhanced, but a psychological state of the pedestrian varies from time to time, and thus a psychological burden (stress) may be given.

The present disclosure has been made in view of the above problems, and provides a traffic facility control system, a traffic facility control method, and a program capable of achieving both ensuring of physical safety of a moving person and reduction of a psychological burden on the moving person.

A traffic facility control system according to the present disclosure includes: a detection unit configured to detect a moving ability of a person; a determination unit configured to determine a psychological state of the person; and a control unit configured to control a traffic facility installed at at least one of a vicinity of a current position of the person, a position on a route along which the person moves, or a position along the route based on the moving ability of the person and the psychological state of the person.

As a result, in the traffic facility control system, a traffic facility installed at at least one of the vicinity of the current position of a person, a position on a route along which the person moves, or a position along the route can be controlled based on a moving ability and a psychological state of the person who is a moving person. Therefore, it is possible to achieve both ensuring of physical safety of the person and reduction of a psychological burden on the person.

The detection unit may detect at least a walking ability of the person as the moving ability of the person. As a result, in the traffic facility control system, since the walking ability used for controlling the traffic facility can be directly detected, the traffic facility can be controlled based on the current walking ability.

The detection unit may detect the moving ability of the person by detecting the presence or absence of a carried object or an accompanying person that hinders movement of the person, and calculating the moving ability of the person based on a result of the detecting. As a result, in the traffic facility control system, as the walking ability used for controlling the traffic facility, not only the walking ability itself of the person but also a walking ability in consideration of the presence of a carried object or an accompanying person can be detected, so that the traffic facility can be controlled based on a walking ability further considering the state of the person.

The traffic facility control system may further include a first acquisition unit configured to acquire vital information of the person measured by a measuring instrument worn by the person, in which the determination unit determines the psychological state of the person based on the vital information. As a result, in the traffic facility control system, the psychological state of the person can be determined based on the vital information measured by the measuring instrument worn by the person, so that it is possible to control the traffic facility based on the accurate psychological state of the person.

The traffic facility control system may further include an identification unit configured to identify the person, in which the determination unit determines the psychological state of the person based on the vital information by using a learning model trained by machine learning for the person identified by the identification unit. As a result, in the traffic facility control system, since the psychological state of the person is determined by using the learning model trained by machine learning for the person based on the vital information measured by the measuring instrument worn by the person, the psychological state of the person can be accurately determined.

The traffic facility control system may further include a second acquisition unit configured to acquire imaging data obtained by capturing a face image of the person, in which the determination unit determines the psychological state of the person based on the imaging data. As a result, in the traffic facility control system, since the psychological state of the person is determined based on the imaging data of the face image in which the psychological state of the person is likely to appear, the psychological state of the person can be accurately determined.

The traffic facility control system may further include an identification unit configured to identify the person, in which the determination unit determines the psychological state of the person based on the imaging data by using a learning model trained by machine learning for the person identified by the identification unit. As a result, in the traffic facility control system, the psychological state of the person is determined by using the learning model trained by machine learning for the person based on the imaging data of the face image in which the psychological state of the person is likely to appear, so that the psychological state of the person can be determined more accurately.

The control unit may control at least one of a change timing or a duration of a changed state for at least one of a change in display or a change in shape of the traffic facility. As a result, in the traffic facility control system, control is performed in such a way as to change at least one of the display or the shape of the traffic facility based on the moving ability and the psychological state of the person, so that the traffic facility can be controlled in consideration of the moving ability and the psychological state of the person.

The traffic facility control system may further include: an identification unit configured to identify the person; and a third acquisition unit configured to acquire disease information indicating a disease related to the walking ability of the person identified by the identification unit, in which the control unit controls the traffic facility based on the moving ability of the person, the psychological state of the person, and the disease information. As a result, in the traffic facility control system, the traffic facility can be controlled in consideration of the disease information of the person.

The traffic facility control system may further include a prediction unit configured to predict a direction in which the person moves, in which the control unit controls the traffic facility based on the predicted direction in which the person moves, the moving ability of the person, and the psychological state of the person. As a result, in the traffic facility control system, the traffic facility can be controlled in consideration of a result of predicting a direction in which the person moves.

The traffic facility control system may further include a viewing determination unit configured to determine whether or not the person is viewing a portable terminal apparatus, in which the control unit controls the traffic facility based on the moving ability of the person, the psychological state of the person, and a determination result obtained by the viewing determination unit. As a result, in the traffic facility control system, the traffic facility can be controlled in consideration of whether or not the person is viewing the portable terminal apparatus, and thus, safety can be improved.

The control unit may control a notification apparatus provided as a part of the traffic facility to make a notification according to a content of control for a facility other than the notification apparatus in the traffic facility. As a result, in the traffic facility control system, the notification apparatus can notify the person of a control content of the traffic facility other than the notification apparatus, so that the safety can be further improved.

The traffic facility control system may further include: an identification unit configured to identify the person; and a notification unit configured to notify a terminal apparatus used by the person identified by the identification unit of a content of control for the traffic facility. As a result, in the traffic facility control system, it is possible to notify the terminal apparatus used by the person of the control content of the traffic facility for the person, and thus, it is possible to further improve safety.

The traffic facility control system may further include: an identification unit configured to identify the person; and an inquiry unit configured to inquire a terminal apparatus used by the person identified by the identification unit about whether or not to perform control of the traffic facility based on the moving ability of the person and the psychological state of the person. As a result, in the traffic facility control system, it is possible to determine whether or not to control the traffic facility in consideration of an intention of the person.

The detection unit may detect a moving ability of a user of a mobile body as a person to be detected, and the control unit may control a traffic facility installed at at least one of a vicinity of a current position of the mobile body, a position on a route along which the mobile body moves, or a position along the route based on the moving ability of the person and the psychological state of the person. As a result, in the traffic facility control system, even in a case where a person moves using a mobile body, it is possible to achieving both ensuring of physical safety of the person and reduction of a psychological burden on the person.

A traffic facility control method according to the present disclosure includes: inputting a result of detecting a moving ability of a person; inputting a result of determining a psychological state of the person; and controlling a traffic facility installed at at least one of a vicinity of a current position of the person, a position on a route along which the person moves, or a position along the route based on the moving ability of the person and the psychological state of the person.

As a result, in the traffic facility control method, a traffic facility installed at at least one of the vicinity of the current position of a person, a position on a route along which the person moves, or a position along the route can be controlled based on a moving ability and a psychological state of the person who is a moving person. Therefore, it is possible to achieve both ensuring of physical safety of the person and reduction of a psychological burden on the person.

A program according to the present disclosure is a program for causing a computer to execute: inputting a result of detecting a moving ability of a person; inputting a result of determining a psychological state of the person; and controlling a traffic facility installed at at least one of a vicinity of a current position of the person, a position on a route along which the person moves, or a position along the route based on the moving ability of the person and the psychological state of the person.

As a result, in the program, a traffic facility installed at at least one of the vicinity of the current position of a person, a position on a route along which the person moves, or a position along the route can be controlled based on a moving ability and a psychological state of the person who is a moving person. Therefore, it is possible to achieve both ensuring of physical safety of the person and reduction of a psychological burden on the person.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 7 is a diagram illustrating an example of a table used for controlling the traffic facilities in the traffic system of FIG. 3;

FIG. 9 is a diagram illustrating an example of a table used for collecting information for controlling traffic facilities in the traffic system of FIG. 8;

FIG. 12 is a diagram illustrating an example of training data used in the learning system of FIG. 11;

FIG. 13 is a diagram illustrating another example of the training data used in the learning system of FIG. 11.

DESCRIPTION OF EMBODIMENTS

Hereinafter, the present disclosure will be described with embodiments of the disclosure, but the disclosure according to the claims is not limited to the following embodiments. In addition, not all the configurations described in the embodiments are essential as means for solving the problem. Hereinafter, embodiments will be described with reference to the drawings.

<Embodiment>

Figure 1:
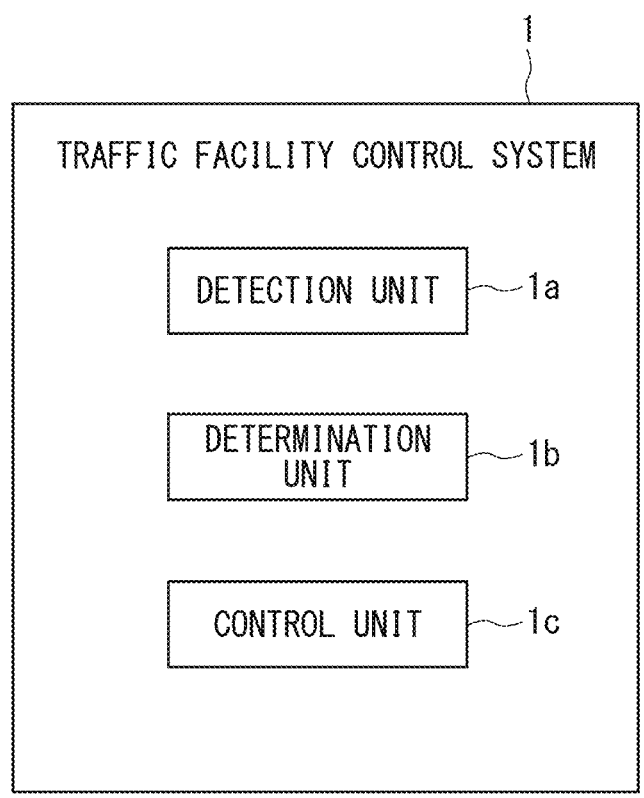
FIG. 1 is a block diagram illustrating a configuration example of a traffic facility control system according to an embodiment.

FIG. 1 is a block diagram illustrating a configuration example of a traffic facility control system according to the present embodiment.

As illustrated in FIG. 1, a traffic facility control system 1 according to the present embodiment is a system for controlling one or a plurality of traffic facilities (traffic infrastructures), and can include a detection unit 1a, a determination unit 1b, and a control unit 1c.

The detection unit 1a detects a moving ability of a person. For example, the detection unit 1a can detect a moving ability of a person as one of a plurality of levels set based on a predetermined standard.

The detection unit 1a can include a sensor for the purpose of detecting a moving ability itself of a person, measuring a value based on which a moving ability of a person is calculated, or acquiring imaging data based on which a moving ability of a person is calculated. The type of the sensor and the number of sensors are not limited, and a detection method thereof is not limited. Here, the sensor that detects a moving ability itself of a person can be a sensor that measures one or a plurality of predetermined types of information that can express a moving ability of a person. In addition, a sensor that acquires imaging data that is moving image data or a series of still image data captured at predetermined intervals corresponds to an imaging apparatus (hereinafter, referred to as a camera).

For example, the detection unit 1a includes a camera that acquires imaging data by imaging, and can detect a motion (a state of the motion) of a person from the acquired imaging data. The detection unit 1a can determine a moving ability of a person by comparing the moving ability with a predetermined standard based on at least one piece of information such as the speed and magnitude of a motion (for example, a movable range of the limb), and output the determination result as the detection result.

In addition, the detection unit 1a may detect at least a walking ability of a person as the moving ability of the person. It is a matter of course that, for the detection of a walking ability of a person, a sensor of the type used for detection of a moving ability of a person as described above can be used. The detection unit 1a may detect a running ability of a person as the moving ability of the person.

Examples of a detection method specialized for a walking ability of a person include the following methods. For example, the detection unit 1a can recognize the skeleton from the posture and physique of a person by imaging the person with the camera and inputting the obtained imaging data to a learning model for skeleton recognition, and can also calculate a stride length and a walking speed from a displacement of the skeleton. Then, the detection unit 1a can calculate and obtain a walking ability of a person based on the skeleton, a stride length, and a walking speed.

Furthermore, the detection unit 1a can be configured to image a person with the camera and determine at least one of whether or not a wheelchair is used, whether or not a white cane is used, or whether or not a cane of another color is used from the obtained imaging data. Since a person using a wheelchair or a cane is assumed to have a low walking ability, in this case, the detection unit 1a can output a detection result indicating that the walking ability is at a low level. The detection unit 1a can output a detection result indicating that the walking ability is at an even lower level, for a person using a white cane.

In addition, the detection unit 1a can include, for example, a sensor that detects a carried object or an accompanying person that hinders movement of a person. The sensor may be a camera, but is not limited thereto, and may be, for example, a sensor that detects a radio wave of a carried object configured to emit a predetermined radio wave.

Then, the detection unit 1a may detect a moving ability of a person by detecting the presence or absence of a carried object or accompanying person that hinders movement of the person with the sensor and calculating the moving ability of the person based on the detection result. The movement of a person here can refer to movement of a person alone, that is, walking or running. In addition, the detection unit 1a may detect a moving ability of a person by calculating the moving ability of the person based on a result of detection of the presence or absence of a carried object or accompanying person and a separately detected walking ability.

Examples of the carried object that hinders movement of a person include a carried object whose size is larger than a predetermined size, such as a large backpack or a suitcase, and a carried object having a predetermined shape, such as a backpack that sags and looks heavy. Examples of the accompanying person include an accompanying person whose size is smaller than a predetermined size such as a baby. For example, in a case where two persons are moving together, which person is to be set as a detection target can be determined according to a predetermined standard, and the other person can be excluded from the detection target. However, each of the two persons can also be the detection target. It is a matter of course that the same applies to a case where three or more people are moving together.

The determination unit 1b determines a psychological state of a person detected by the detection unit 1a. However, it is sufficient that a psychological state and a moving ability of a target person can be associated with each other regardless of the order of processing in the detection unit 1a and the determination unit 1b. For example, the determination unit 1b may determine a psychological state of a person, and the detection unit 1a may detect a moving ability of the person for which the determination has been made by the determination unit 1b.

For example, the determination unit 1b can determine a psychological state of a person as one of a plurality of levels set based on a predetermined standard. The psychological state of a person can be determined as, for example, a stress level of the person, but is not limited thereto. For example, the determination unit 1b can extract data of a face region (face image data) from the imaging data obtained by the camera, and detect or determine a facial expression of the person from the face image data. Then, the determination unit 1b can determine a psychological state of the person based on the detected or determined facial expression. Here, in a case where the detection unit 1a includes a camera, the camera used to acquire the face image data can be the camera included in the detection unit 1a, or may be another camera.

Furthermore, the determination unit 1b can include, for example, a sensor other than the camera, the sensor measuring a psychological state of a person. A method for the measurement is not limited.

Furthermore, the determination unit 1b can be configured to identify a determination target person and acquire information indicating a psychological state of the person from an external system. In this case, the person and the information indicating the psychological state of the person are stored in the external system in association with each other. Determination based on the latest information is possible by keeping the information up to date, and information indicating the latest psychological state can be reflected in control to be described below. It is a matter of course that the determination unit 1b is not limited to these examples, and a method for the determination is not limited thereto.

Next, an installation place where the camera or another type of sensor included in the detection unit 1a is installed and an installation place where the camera or another type of sensor included in the determination unit 1b is installed will be described as an example. The sensor in the detection unit 1a and the sensor in the determination unit 1b can be installed in a state of being supported by a support such as a pole or a gate disposed at the installation place.

The sensors included in the detection unit 1a can be installed at substantially equal intervals in a management target region in a region where a person is assumed to move, or can be installed at substantially equal intervals on a road such as a sidewalk that can be assumed as a movement route of a person, but the intervals at which the sensors are arranged is not limited to the equal intervals. For example, it is also possible to decrease the installation interval of the sensors at points where there is a change such as an intersection or a curve on a road. In addition, the sensor included in the detection unit 1a can be installed at least at a place where a person is likely to pass, such as an entrance of the management target region and can also be installed continuously, for example, at regular intervals from the entrance. In addition, in a case where there is a bus (or an autonomous mobile body) that travels around a certain route in the management target region, the sensor can be installed at a bus stop.

Here, the management target region can be a region in which a traffic facility to be controlled by the control unit 1c described below is arranged, and can also be a region designated on a town basis, a district basis, a prefecture basis, or the like, for example.

In a case where the determination unit 1b includes the sensors, similarly to the sensor of the detection unit 1a, the sensors can be installed at substantially equal intervals in the management target region in a region where a person is assumed to move, or can be installed at substantially equal intervals on a road such as a sidewalk, but the intervals at which the sensors are arranged is not limited to the equal intervals. For example, it is also possible to decrease the installation interval of the sensors at points where there is a change such as an intersection or a curve on a road. In addition, similarly to the sensor of the detection unit 1a, the sensor included in the determination unit 1b can also be installed at least at a place where a person is likely to pass in the management target region, can also be installed continuously from the place, for example, at regular intervals, or can also be installed at a bus stop.

Any one of the installation interval of the sensors in the detection unit 1a and the installation interval of the sensors in the determination unit 1b may be small, and for example, any one that easily changes can be small depending on whether the detection result or the determination result can be easily changed.

In a case where the determination unit 1b includes the sensors, the sensors can use the sensors in the detection unit 1a, or can be installed at the same installation places as all or some of the sensors in the detection unit 1a. In this case, sensing by the sensor is performed.

Since the sensor in the detection unit 1a and the sensor in the determination unit 1b perform sensing at each installation place, a sensing area at each installation place can also be referred to as a sensing zone. For example, since a result of detection of a moving ability of a person and a result of determination of a psychological state of a person can also be used for health state management, the sensing zone can also be referred to as a healthcare zone. The healthcare zone is a zone in which data indicating a health state is acquired when a person only passes through the zone by walking or the like. The healthcare zone can include various sensors such as a camera necessary for acquiring information, and a support such as a pole or a gate that supports the various sensors. As described as the installation place of the sensor, the healthcare zone can be installed at least at a place where a person is likely to pass in the management target region, can be installed continuously, for example, at regular intervals from the place, or can be installed at a bus stop.

In addition, as can be seen from the fact that a person moves on a road such as a sidewalk, unless it is a one-way road or the like in a region where a person moves, movement of a person is not limited to movement in one direction, and includes movement in two directions opposite to each other. Therefore, at least two sets of sensors included in any one of the detection unit 1a and the determination unit 1b can be arranged in such a way as to be able to cope with traffic of people in at least two directions, or a sensor that supports detection in multiple directions (or all directions) including at least the two directions can be adopted.

The control unit 1c receives the moving ability and the psychological state of the person obtained by the detection unit 1a and the determination unit 1b, respectively. Then, the control unit 1c controls, based on the input moving ability and psychological state of the person, a traffic facility installed at at least one of the vicinity of the current position of the person, a position on a route along which the person moves, or a position along the route.

Here, the vicinity of the current position of the person can be, for example, the position of the sensor in the detection unit 1a or a detection range of the sensor. However, in a case where the determination unit 1b includes the sensor, the vicinity of the current position of the person can be defined as the position of the sensor or a detection range of the sensor.

Alternatively, in a case where the sensor can roughly detect a distance and direction from the sensor to the person, the vicinity of the current position of the person can be a region within a predetermined distance and a predetermined direction from the position of the person detected by the sensor. For example, the traffic facility installed in the vicinity of the current position of the person may be a traffic facility of which an azimuth angle is within a predetermined range from an orientation of the face of the person and which is installed within a predetermined distance from the person, or a traffic facility installed within a predetermined radius around the person.

Furthermore, the position on the route along which the person moves can be a range within a predetermined distance in a moving direction of the person from the current position of the person represented by the position of the sensor, an actual detection position of the person, or the like, and the moving direction can be a direction along a road in a case of a road such as a sidewalk, for example. As will be described below, the route may be a route indicated by a navigation system in a portable terminal apparatus (not illustrated) used by the person. In this case, the moving direction may be a traveling moving indicated by the route. In addition, the position along the route can be a position included in a range having a predetermined width in a direction perpendicular to the moving direction (a left-right direction of the person) at the position on the route.

Although a control example in the control unit $1c$ will be described below, only a simple example will be described. For example, the control unit $1c$ customizes a length of a green phase of a traffic light according to a result indicating whether a person is in a wheelchair and a result indicating whether a person is in an excessive stress state or in a calm state. The excessive stress state can refer to a state in which a person is anxious or irritated. For example, the length of the green phase of the traffic light is set to be longer for a person using a wheelchair than for a person not using a wheelchair, and the length of the green phase of the traffic light is set to be longer for a person in the excessive stress state than for a person in the calm state. This is because it is necessary to control the traffic facility in further consideration of safety in movement of a person in the excessive stress state. In this example, control is determined based on two types of determination results, that is, based on two-stage determination results. However, it is a matter of course that control may be determined based on three or more determination results.

In addition, in a case where a plurality of persons are detection and determination targets, a priority of information used for the control in the control unit $1c$ can be set in such a way that information regarding a person with the lowest moving ability has a high priority, and information regarding a person with the worst psychological state has a high priority. For example, the control unit $1c$ can control the traffic facility such as determining the length of the green phase of the traffic light for a person with the lowest moving ability or a person with the worst psychological state.

Furthermore, the control unit $1c$ can be implemented by, for example, a processor such as a central processing unit (CPU), a work memory, a nonvolatile storage apparatus, and the like. A control program executed by the processor is stored in the storage apparatus, and the processor reads the program to the work memory and executes the program, so that the function of the control unit $1c$ can be implemented. Furthermore, the present disclosure is not limited to this example, and the control unit $1c$ can be implemented by a configuration including an integrated circuit.

The control program can also include at least one of a program for implementing a function other than the sensor in the detection unit $1a$ and a program for performing determination in the determination unit $1b$. In this case, the processor reads the program to the work memory and executes the program, so that the function of the control unit $1c$ and at least one of the function other than the sensor of the detection unit $1a$ and the function of the determination unit $1b$ (in a case where the determination unit $1b$ includes the sensor, a sensor other than the sensor of the determination unit $1b$) can be implemented. Functions not included in the control program can be implemented by a hardware configuration.

Figure 2:
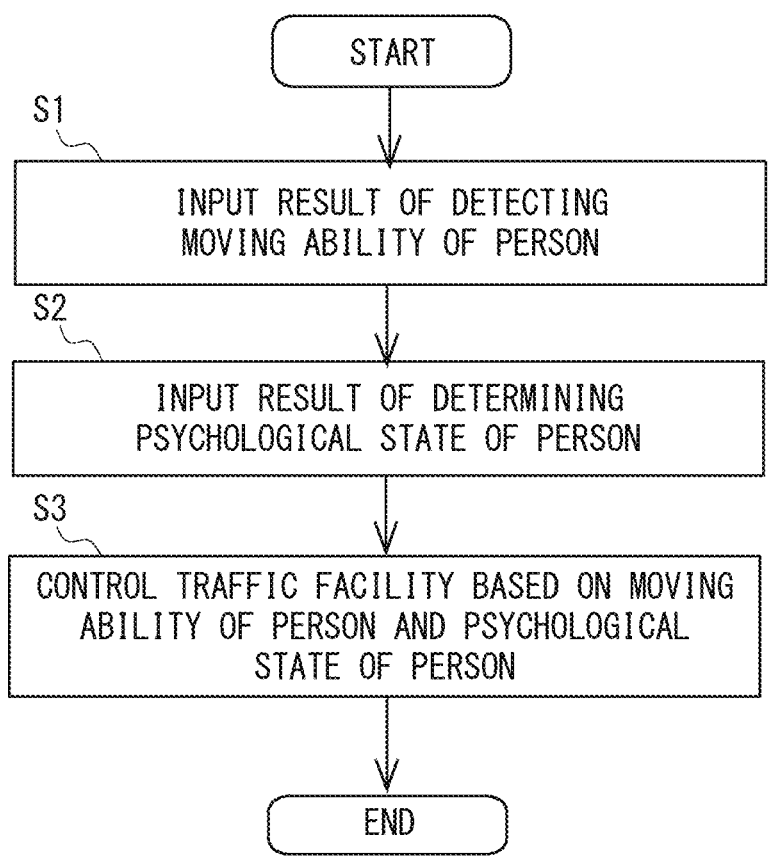
FIG. 2 is a flowchart for explaining an example of control in the traffic facility control system of FIG. 1.

Next, an example of a traffic facility control method executed by the traffic facility control system 1 will be described with reference to FIG. 2. FIG. 2 is a flowchart for explaining an example of control in the traffic facility control system 1 of FIG. 1.

In the traffic facility control method, first, the control unit $1c$ inputs a result of detecting a moving ability of a person (step S1), and inputs a result of determining a psychological state of the person (step S2). The order of steps S1 and S2 is not limited. In steps S1 and S2, the detection result of the detection unit $1a$ and the determination result of the determination unit $1b$ can be input.

Next, the control unit $1c$ controls a traffic facility installed at at least one of the vicinity of the current position of the person, a position on a route along which the person moves, or a position along the route based on the moving ability of the person and the psychological state of the person (step S3), and ends the processing.

The above-described control program can include a program for causing a computer to execute the processing indicated by such a traffic facility control method. As can be seen from this example, the traffic facility control system 1 can also be constructed as a system that does not include at least one of the detection unit $1a$ or the determination unit $1b$. However, also in this case, the detection result or the determination result need to be input to the system.

With the above-described configuration, in the traffic facility control system 1, a traffic facility installed at at least one of the vicinity of the current position of a person, a position on a route along which the person moves, or a position along the route can be controlled based on a moving ability and a psychological state of the person who is a moving person. Therefore, with the traffic facility control system 1, it is possible to achieve both ensuring of physical safety of a person and reduction of a psychological burden on the person. That is, according to the present embodiment, it is possible to consider physical safety of a person and comfortable movement of a person, and to improve safety and comfort of a moving person.

In addition, as the traffic facility control system 1 is configured to detect at least a walking ability of a person as a moving ability of a person, the walking ability used to control a traffic facility can be directly detected. Therefore, in such a configuration example, a traffic facility can be controlled based on the current walking ability.

In addition, as the traffic facility control system 1 is configured to calculate a moving ability of a person based on a result of detecting the presence or absence of a carried object or accompanying person that hinders movement of the person, it is possible to detect not only his/her own walking ability of the person but also a walking ability in consideration of the presence of the carried object or accompanying person as the walking ability used to control the traffic facility. Therefore, in such a configuration example, a traffic facility can be controlled based on a walking ability further considering the state of a person.

Figure 3:
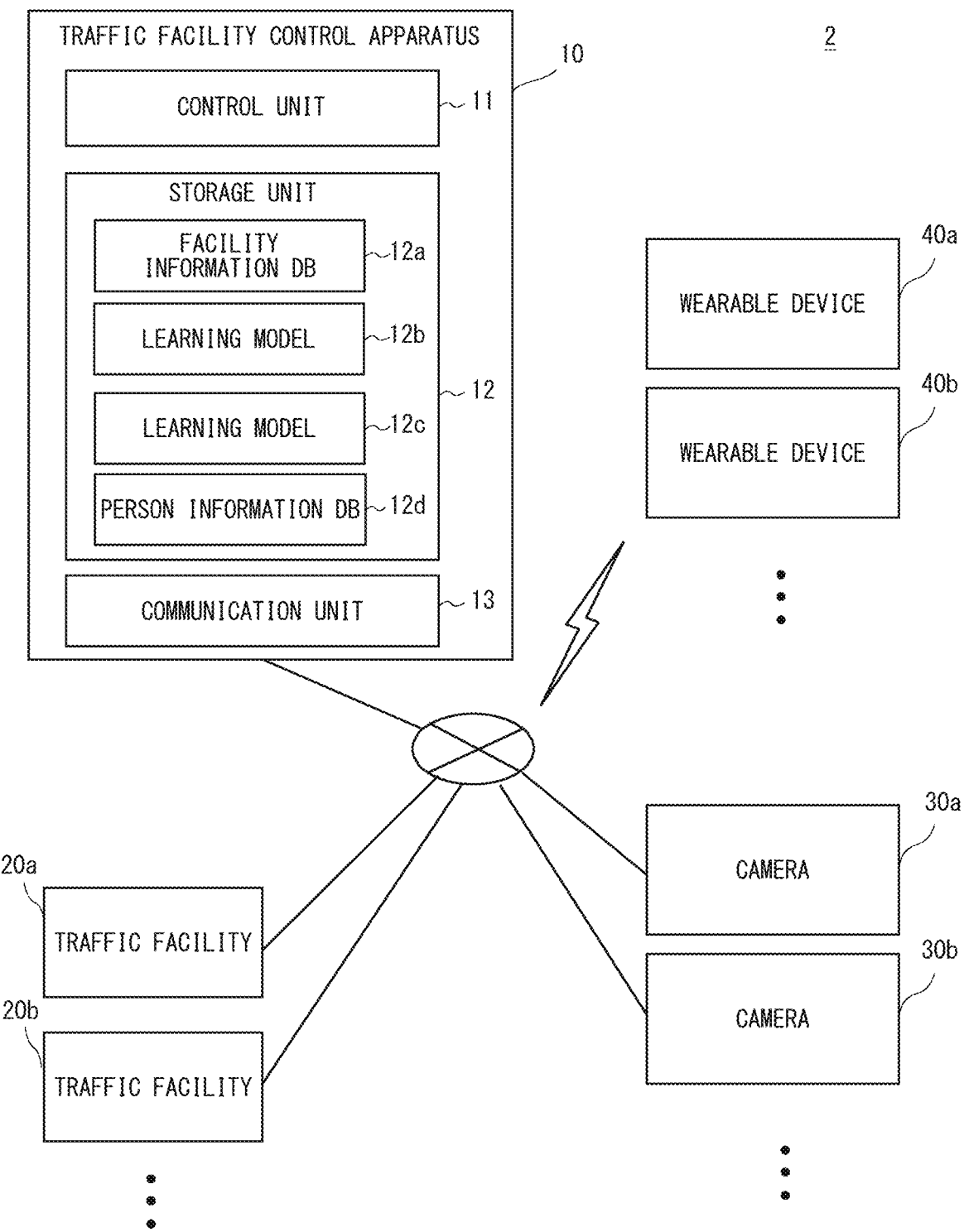
FIG. 3 is a block diagram illustrating a configuration example of a traffic system including the traffic facility control system of FIG. 1.

Next, a configuration example of the traffic facility control system 1 will be described in detail. FIG. 3 is a block diagram illustrating a configuration example of a traffic system including the traffic facility control system 1 of FIG. 1.

As illustrated in FIG. 3, a traffic system 2 can include a traffic facility control apparatus 10 as a part of the traffic facility control system 1 and a plurality of traffic facilities 20a, 20b, and the like. The traffic facility control system 1 will be described on the assumption that the traffic facility control system 1 does not include the traffic facilities 20a, 20b, and the like to be controlled, but may be defined as a system including the traffic facilities.

The traffic facility control apparatus 10 is an apparatus that controls the plurality of traffic facilities 20a, 20b, and the like, and can include, for example, a computer. The traffic facility control apparatus 10 can be configured alone, but can also be configured as a distributed system in which functions thereof are distributed. It is a matter of course that the number of traffic facilities to be controlled may be one.

In addition, the traffic system 2 can include a sensor group for obtaining information used for control in the traffic facility control apparatus 10 as a part of the traffic facility control system 1. As illustrated in FIG. 3, the sensor group can include, for example, a plurality of cameras 30a, 30b, and the like, and can further include wearable devices 40a, 40b, and the like worn by persons.

In the following description, in a case where the traffic facilities 20a, 20b, and the like are not distinguished from one another, they are referred to as the traffic facility 20. Similarly, in a case where the cameras 30a, 30b, and the like and the wearable devices 40a, and the like are not individually distinguished, they are referred to as the camera 30 and the wearable device 40, respectively.

The traffic facility control apparatus 10 can include a control unit 11 that controls the entire traffic facility control apparatus 10, a storage unit 12 implemented by a storage apparatus, and a communication unit 13 implemented by a communication interface or the like that communicates with an external apparatus.

It is assumed that the control unit 11 has a function other than the sensor in the detection unit 1a and a function other than the sensor in the determination unit 1b together with the function of the control unit 1c. Similarly to the control unit 1c, the control unit 11 can be implemented by, for example, a processor, a work memory, a nonvolatile storage apparatus, and the like. A control program executed by the processor is stored in the storage apparatus, and the processor reads the program to the work memory and executes the program, so that the function of the control unit 11 can be implemented. The control program can include a program for implementing a function other than the sensor in the detection unit 1a and a program for implementing a function other than the sensor in the determination unit 1b. In this case, the processor reads the program to the work memory and executes the program, thereby implementing the functions. Note that functions not included in the control program can be implemented by a hardware configuration.

The storage unit 12 can store a facility information database (DB) 12a which is a DB storing information regarding the traffic facility 20, a learning model 12b, and a learning model 12c, and a person information DB 12d which is a DB storing person information. The information regarding the traffic facility 20, the person information, coefficients of the learning models 12b and 12c, and the like stored in the storage unit 12 can be kept up to date as appropriate. In addition, although not illustrated, the storage unit 12 also stores position information indicating an installation position of a sensor such as the installed camera 30. Details of the facility information DB 12a, the learning model 12b, the learning model 12c, and the person information DB 12d will be described below.

In order to obtain information necessary for the control of the traffic facility 20 in the control unit 11, the communication unit 13 performs communication via a wired network that is the same as or different from that of the camera 30, performs communication with the wearable device 40 via a wireless network, and transfers the obtained information to the control unit 11. In addition, the communication unit 13 communicates with the traffic facility 20 via a wired network in order to obtain the current state (the current control state such as a current display color in a case of a traffic light, for example) of the traffic facility 20 as necessary and to transmit a control signal for controlling the traffic facility 20 to be controlled. However, regardless of a method for communication between the communication unit 13 and another apparatus, as long as wireless communication is performed with at least the wearable device 40, wireless communication with the traffic facility 20 and the camera 30 may be performed.

The camera 30 is a camera used as the sensor of the detection unit 1a and the determination unit 1b, images the face and the entire body of a person, acquires imaging data, and transmits the imaging data to the traffic facility control apparatus 10. The camera 30 can include a communication interface built in or be connected to a communication interface for the transmission. The imaging data is received by the communication unit 13 of the traffic facility control apparatus 10 and transferred to the control unit 11.

The wearable device 40 is an example of a measurement apparatus that measures vital information of a person in order to determine a psychological state of the person. The wearable device 40 may be a smart watch, a smart ring, an IC chip embedded in the body, or the like, but is not limited thereto.

Furthermore, the vital information measured by the wearable device 40 can be, for example, information indicating one or more of a pulse rate or heart rate, a respiration (rate), a blood pressure, a body temperature, and the like. The vital information is information whose value changes even for the same person, for example, while the person is controlling his/her bladder, while the person is running, or while the person is walking normally.

The wearable device 40 directly or indirectly transmits the acquired vital information to the traffic facility control apparatus 10. The wearable device 40 can include a communication interface built in or be connected to a communication interface for the transmission.

In a simple example, the wearable device 40 can be configured to spontaneously transmit the vital information to the traffic facility control apparatus 10, for example, at a predetermined interval or the like. The transmission may be direct or indirect. In this case, the traffic facility control apparatus 10 can have a function of collecting and managing the vital information as a server apparatus (not illustrated) or the like. In this case, transmission of the vital information to the traffic facility control apparatus 10 may be permitted in advance in the wearable device 40 or a portable terminal apparatus (not illustrated) connectable thereto. In such a spontaneous transmission example, it is not necessary to transmit a vital information transmission request in a state where the wearable device is designated from the traffic facility control apparatus 10, and an identification unit to be described below is unnecessary.

In either case of direct or indirect transmission, the vital information is received by the communication unit 13 of the traffic facility control apparatus 10 and transferred to the control unit 11. As in this example, the traffic facility control apparatus 10 can include an acquisition unit (referred to as a first acquisition unit for convenience) that acquires vital information of a person measured by a measuring instrument worn by the person. In the example of FIG. 3, the communication unit 13 and the control unit 11 that controls the acquisition are examples of the first acquisition unit.

An example in which the wearable device 40 indirectly transmits the vital information will be described. The wearable device transmits the vital information to the portable terminal apparatus used by the person wearing the wearable device 40 by short-range wireless communication or the like, and the portable terminal apparatus transmits the vital information to the traffic facility control apparatus 10. The portable terminal apparatus can be, for example, a portable phone such as a smartphone, a tablet terminal, a mobile personal computer (PC), or the like. A method for the short-range wireless communication described above and below is not limited, and various methods such as Wi-Fi (registered trademark), Bluetooth (registered trademark), Bluetooth Low Energy (registered trademark), and ZigBee (registered trademark) can be adopted.

In addition, the vital information can be transmitted via a communication interface with which short-range wireless communication with the wearable device 40 or the portable terminal apparatus can be performed, the communication interface being built in or connected to a sensor that functions as a part of the detection unit 1a or the determination unit 1b, such as the camera 30.

Then, the wearable device 40 or the portable terminal apparatus can be configured to automatically transmit the vital information when entering an area in which wireless communication with the communication interface can be performed. In such a configuration, it is not necessary to transmit a vital information transmission request in a state where the wearable device 40 or the portable terminal apparatus is designated from the traffic facility control apparatus 10, and the identification unit to be described below is unnecessary. Also in this case, transmission of the vital information to the traffic facility control apparatus 10 may be permitted in advance in the wearable device 40 or the portable terminal apparatus.

Alternatively, the wearable device 40 may be configured to return the vital information in a case where a vital information transmission request is received from the traffic facility control apparatus 10 via the communication interface. However, in this case, it is necessary that the traffic facility control apparatus 10 includes the identification unit that identifies a person, and designates the wearable device 40 or the portable terminal apparatus associated with the person (individual) identified by the identification unit to make the vital information transmission request. In this way, the traffic facility control apparatus 10 can transmit the vital information transmission request to the wearable device 40 or the portable terminal apparatus used by the person identified by the identification unit and obtain the vital information as a response. Details of the identification unit will be described below together with the description of the person information DB 12d.

Next, the information and the like stored in the storage unit 12 will be described in detail.

The facility information DB 12a can be a DB that stores, for each of the traffic facilities 20, facility identification information such as an ID and an instrument number for identifying the traffic facility facility type information indicating a type of the traffic facility and position information indicating an installation position of the traffic facility 20 in association with each other. The traffic facility 20 to be controlled can be one or more of various types of traffic facilities 20 described below with reference to FIGS. 4 to 6, for example, regardless of the type and number thereof. The facility type information can be included in the facility identification information or can be implicitly included.

In addition, it is sufficient if the position information is information that specifies a position, such as information indicating latitude and longitude or information indicating coordinates on map data. The position information can be referred to for comparison with the position of a person, or for comparison with the position of a sensor such as the camera 30 in a case where the position of the sensor is used as the position of a person. Furthermore, the position information can include information indicating a direction in which a person can view the traffic facility 20 in a case where the traffic facility 20 is a facility having a function of displaying information to be viewed by a person. Furthermore, the position information can include information indicating a direction suitable for a person to listen a sound in a case where the traffic facility 20 is a facility having a function of outputting a sound.

The learning model 12b is a learning model that receives imaging data (image data) obtained by imaging a person with the camera 30 and outputs a detection result obtained by detecting (determining) a moving ability of the person, and an algorithm thereof or the like is not limited. In addition, the input parameters are not limited thereto. Furthermore, the learning model 12b can output, for example, information indicating any of a plurality of levels determined in advance based on a predetermined standard as the detection result.

The learning model 12b can be obtained, for example, as follows. That is, the learning model 12b can be obtained by inputting, to an untrained learning model, a data set including imaging data obtained by imaging a person with a camera (which may or does not have to be a camera having the same performance as the camera 30) and ground truth data regarding a moving ability of the person obtained from the person himself/herself or a doctor or the like who has determined the moving ability of the person, to perform machine learning. The learning model 12b can be a model that can accurately determine the moving ability of the person based on the imaging data by learning the data set for a number of persons to the extent that over-learning does not occur. Note that a system that performs such learning will be described below.

As described above, the control unit 11 can be configured to detect a moving ability of a person based on the imaging data by using the learning model 12b as a function of the detection unit 1a. However, the control unit 11 can also detect a moving ability of a person based on the imaging data without using the learning model 12b.

Furthermore, in addition to the use of the learning model 12b, the control unit 11 can detect a moving ability of a person based on imaging data captured by the camera 30 as a part of the function of the detection unit 1a. The imaging data used for detection can be imaging data obtained by imaging the entire body of a person, and it is not necessary to image even a facial expression of the person only for detection. However, in a case where a psychological state of the person is determined based on at least the facial expression of the person or in a case where the person is identified from a face image, the imaging data includes data obtained by imaging the face of the person. The traffic facility control apparatus 10 is configured to detect a moving ability of a person based on imaging data captured by the camera 30, so that it is possible to accurately control the traffic facility based on the moving ability of the person.

The learning model 12c is a learning model that receives at least one of the vital information of a person obtained from the wearable device 40 and imaging data obtained by imaging the person including the face by the camera 30, and outputs a determination result obtained by determining a psychological state of the person, and an algorithm or the like thereof is not limited. In addition, the input parameters are not limited thereto. Furthermore, the learning model 12c can output, for example, information indicating any of a plurality of levels determined in advance based on a predetermined standard as the determination result.

The learning model 12c can be obtained, for example, as follows. That is, the learning model 12c can be obtained by inputting, to an untrained learning model, a data set including at least one of vital information or imaging data obtained by imaging a person including the face by the camera 30, and ground truth data regarding a psychological state at that time obtained from the person himself/herself or the like, to perform machine learning. The learning model 12c can be a model that can accurately determine a psychological state of a person based on at least one of the vital information or the imaging data by learning the data set for a number of persons to the extent that over-learning does not occur. Note that a system that performs such learning will be described below.

As described above, the control unit 11 can be configured to determine a psychological state of a person based on the vital information measured by the wearable device 40 using the learning model 12c as a function of the determination unit 1b. However, the control unit 11 can also be configured to determine a psychological state of a person based on the vital information measured by the wearable device 40 without using the learning model 12c.

Furthermore, in addition to the use of the learning model 12c, the control unit 11 can determine a psychological state of a person based on the vital information acquired by the first acquisition unit as a function of the determination unit 1b. The traffic facility control apparatus 10 is configured to determine a psychological state of a person based on vital information measured by a measuring instrument worn by the person, so that it is possible to control the traffic facility based on the accurate psychological state of the person.

Furthermore, as described above, the control unit 11 can be configured to determine a psychological state of a person based on imaging data obtained by imaging the person including the face (that is, the imaging data including face image data) using the learning model 12c as a function of the determination unit 1b.

Here, as described above, the imaging data obtained by capturing the face image of the person by the camera 30 is received by the communication unit 13 of the traffic facility control apparatus 10 and transferred to the control unit 11. As in this example, the traffic facility control apparatus 10 may include an acquisition unit (referred to as a second acquisition unit for convenience) that acquires imaging data obtained by capturing a face image of a person. In the example of FIG. 3, the communication unit 13 and the control unit 11 that controls the acquisition are examples of the second acquisition unit.

As described above, the traffic facility control apparatus 10 is configured to determine a psychological state of a person using the learning model trained by machine learning for the person based on face image data. Since a psychological state of a person easily appears in a face image, and determination using the learning model is adopted, it can be said that a psychological state of a person can be more accurately determined.

However, as described above, the control unit 11 can also be configured to determine a psychological state of a person based on imaging data including face image data without using the learning model 12c. For example, the control unit 11 can be configured to detect a facial expression of a person shown in a face image based on imaging data including face image data, and determine a psychological state of the person based on the detected facial expression.

As described above, the traffic facility control apparatus 10 is configured to determine a psychological state of a person based on face image data. Since a psychological state of a person easily appears in a face image, it can be said that a psychological state of a person can be accurately determined. In addition, a psychological state of a person can be determined based on only one of imaging data in which a facial expression of the person appears or vital information measured by the wearable device 40, but a psychological state such as a stress level can be determined (estimated) more accurately by combining the imaging data and the vital information.

Furthermore, the learning models 12b and 12c can also be constructed as one learning model that receives, for example, vital information of a person and imaging data obtained by imaging the person, and outputs a result of detecting a moving ability of the person and a result of determining a psychological state of the person. Alternatively, the learning models 12b and 12c can be constructed as one learning model that receives, for example, vital information of a person and imaging data obtained by imaging the person, and outputs a traffic facility 20 to be controlled and a control content. Also in these cases, an algorithm or the like of the learning model is not limited.

The traffic facility control apparatus 10 can include the identification unit as described above, and the person information DB 12d can be included as a part of the identification unit. The traffic facility control apparatus 10 can include, as the identification unit, the person information DB 12d and a function of identifying a person with reference to the person information DB 12d, and the control unit 11 can have this function. The identification unit can identify a person by, for example, at least one of face authentication processing or gait authentication processing. The person information DB 12d is a DB referred to for identifying a person and does not need to be stored in a configuration in which identification of a person is unnecessary, that is, in a configuration in which the identification unit is not provided.

The person information DB 12d can be, for example, a DB that stores at least one of face image data or gait data and personal identification information such as a name or an ID for each person to be managed. The face image data can be adopted in a configuration in which the identification unit identifies a person by the face authentication processing, and the gait data can be adopted in a configuration in which the identification unit identifies a person by the gait authentication processing. It is a matter of course that the identification unit can execute both the face authentication processing and the gait authentication processing. For example, when authentication is successful in both the face authentication processing and the gait authentication processing, it can be determined that the person has been identified.

In addition, the personal identification information can include information such as an ID for identifying the wearable device 40 or information such as an ID for identifying a portable terminal apparatus connectable to the wearable device 40 instead of or in addition to the name or ID.

Then, for example, the identification unit can identify a person by comparing imaging data obtained by the camera 30 with at least one of face image data or gait data stored in the person information DB 12d, and output the corresponding individual identification information or the like. In a case where the face authentication processing is used to identify a person, the camera 30 may be installed in such a way as to meet conditions such as a position, an imaging direction, and an imaging magnification for imaging the face of the person, to perform imaging. In a case where the gait authentication processing is used to identify a person, the camera 30 does not need to be installed in such a way as to meet such conditions, and it is sufficient that the camera 30 is installed in such a way as to meet conditions such as a position, an imaging direction, and an imaging magnification for imaging a walking figure of the person (that is, imaging the entire person).

For example, the identification unit may detect a person from imaging data obtained by the camera 30 and execute the above-described comparison processing in a case where the person has been detected. That is, the identification unit may execute the above-described comparison processing when a person enters an imaging range of the camera 30.

Furthermore, the identification unit can be configured to identify a person by using a learning model. That is, instead of the person information DB 12d, a learning model that receives at least one of face image data or imaging data obtained by imaging an entire person and outputs information indicating the person, the wearable device 40, or the portable terminal apparatus can be stored in the storage unit 12. At the time of operation, the control unit 11 can input imaging data captured by the camera 30 to the learning model and obtain information indicating the person, the wearable device 40, or the portable terminal apparatus. In a learning stage, machine learning is executed by a portable terminal apparatus used by each individual, and a learning model as a result of the machine learning, a learned coefficient, or the like is transmitted to the traffic facility control apparatus 10, whereby the traffic facility control apparatus 10 can identify a person by using the learning model for each individual.

Here, a modified example of the learning model 12c will be described. The learning model 12c can be stored as a model trained by machine learning for each person. Then, the control unit 11 may determine a psychological state of a person based on vital information measured by the wearable device 40 for the person by using the learning model trained by machine learning for the person identified by the identification unit. As a result, the traffic facility control apparatus 10 determines a psychological state of a person by using the learning model trained by machine learning for the person based on vital information measured by the wearable device 40 worn by the person, so that the psychological state of the person can be determined more accurately.

In addition, the learning model 12c may be constructed as a model dedicated to each piece of attribute information without being a model dedicated to each person. Here, examples of the attribute information can include at least one of an age group, an age, a gender, or a race. Then, the control unit 11 may determine a psychological state of a person from vital information measured by the wearable device 40 for the person corresponding to the attribute information by using the learning model trained by machine learning for the attribute information. As described above, the traffic facility control apparatus can be configured to determine a psychological state of a person by using the learning model trained by machine learning for the attribute information of the person based on vital information measured by the wearable device 40 worn by the person. Since it is assumed that the vital information is heavily dependent on the attribute information, it can be said that the traffic facility control apparatus 10 having such a configuration can accurately determine a psychological state of a person.

Next, the function of the control unit 1c in the control unit 11 will be described.

The control unit 11 controls a traffic facility 20 installed at at least one of the vicinity of the current position of a person, a position on a route along which the person moves, and a position along the route based on a moving ability and a psychological state of the person obtained by any of the various examples described above. The definitions of the current position, the route, and the like are as described above.

For example, the control unit 11 may control at least one of a change timing or a duration of a changed state for at least one of a change in display or a change in shape of the traffic facility 20. Here, the change in shape of the traffic facility 20 can include, for example, raising and lowering of a lifting type strip, a guardrail, a pole group, and the like, thereby increasing/reducing a road width.

In the traffic facility control apparatus 10 having such a configuration, control is performed in such a way as to change at least one of the display or the shape of the traffic facility 20 based on a moving ability and a psychological state of a person, so that the traffic facility 20 can be controlled in consideration of the moving ability and the psychological state of the person.

Figure 4:
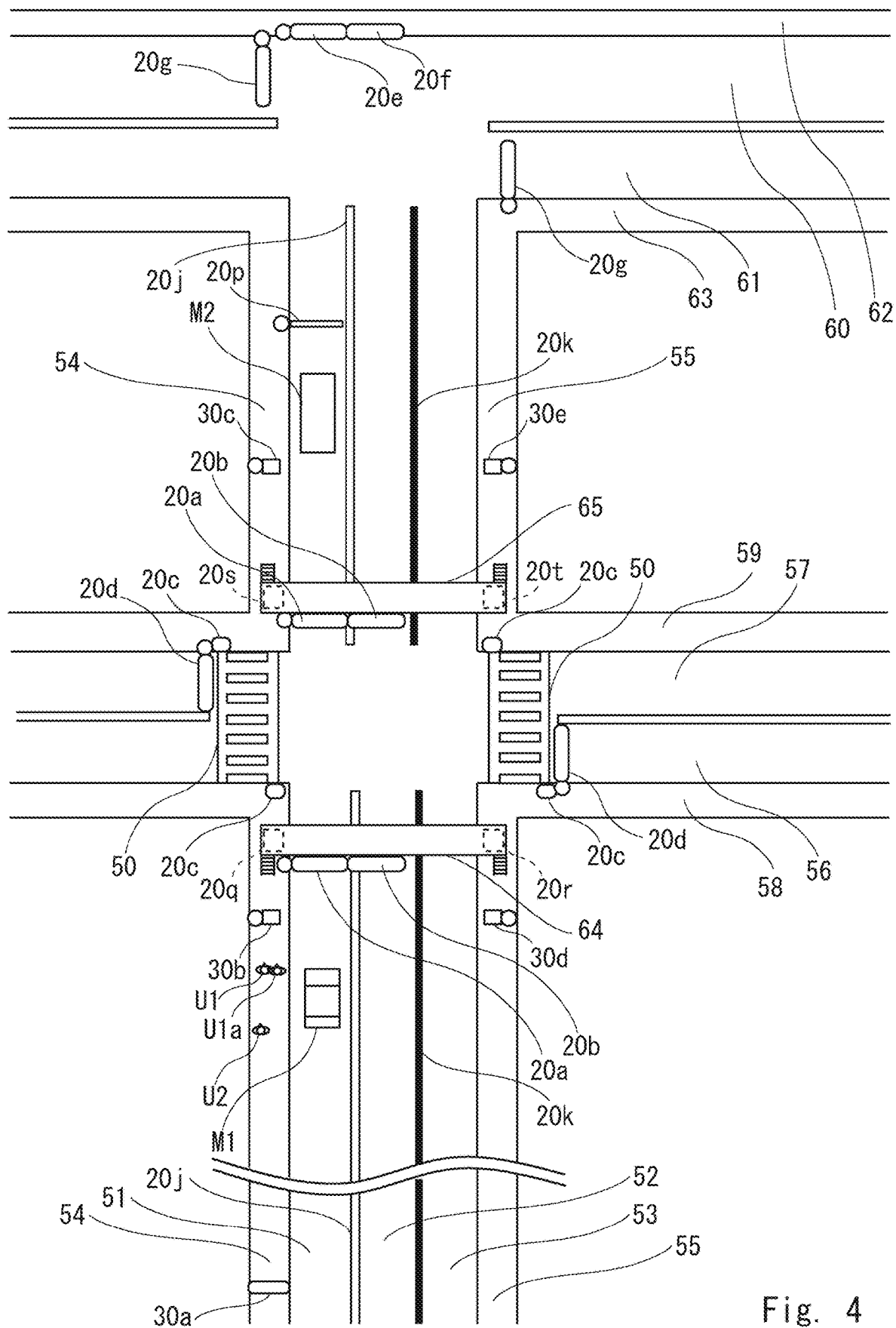
FIG. 4 is a schematic top view illustrating an arrangement example of traffic facilities in the traffic system of FIG. 3.
Figure 5:
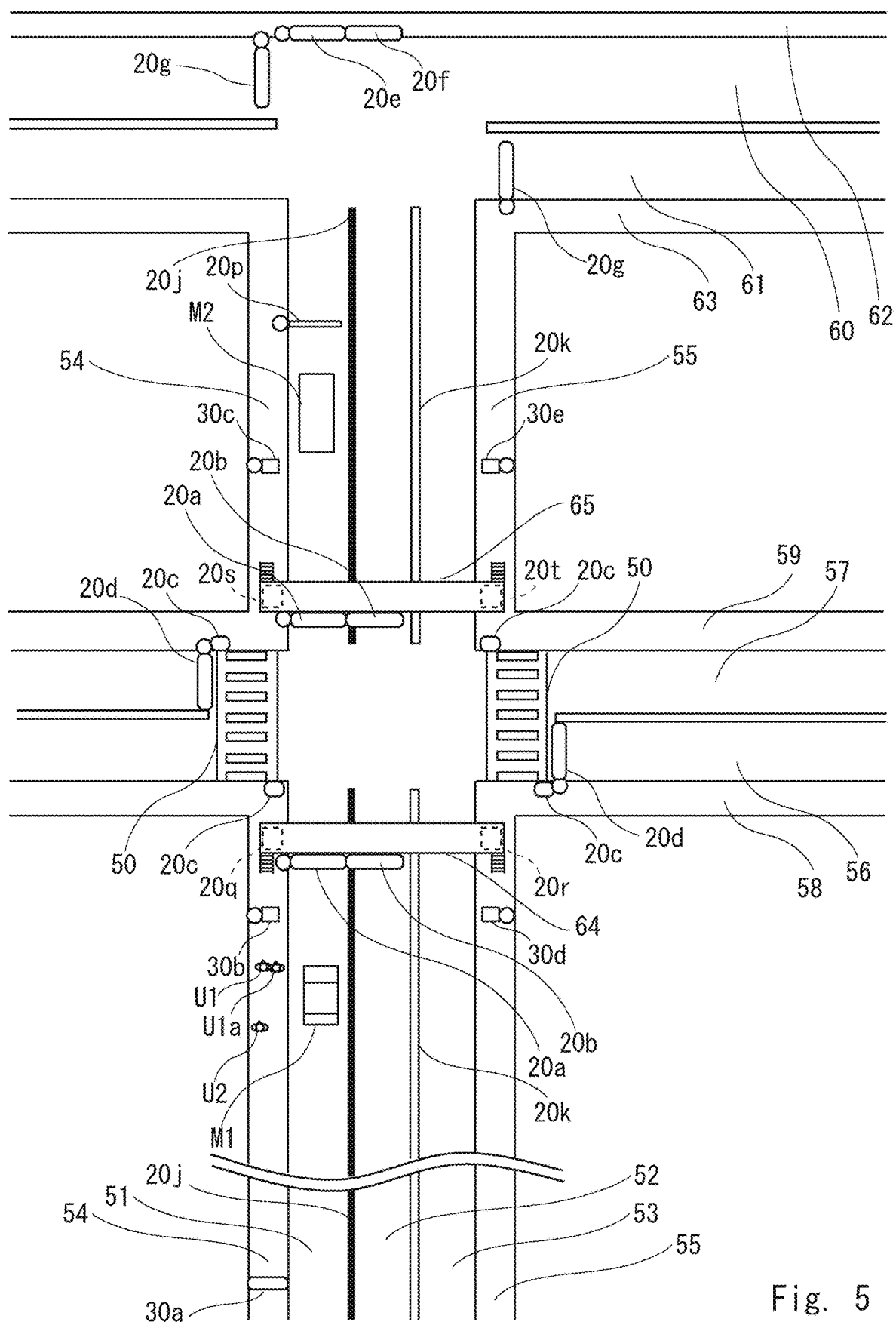
FIG. 5 is a schematic top view illustrating an arrangement example of the traffic facilities in the traffic system of FIG. 3.
Figure 6:
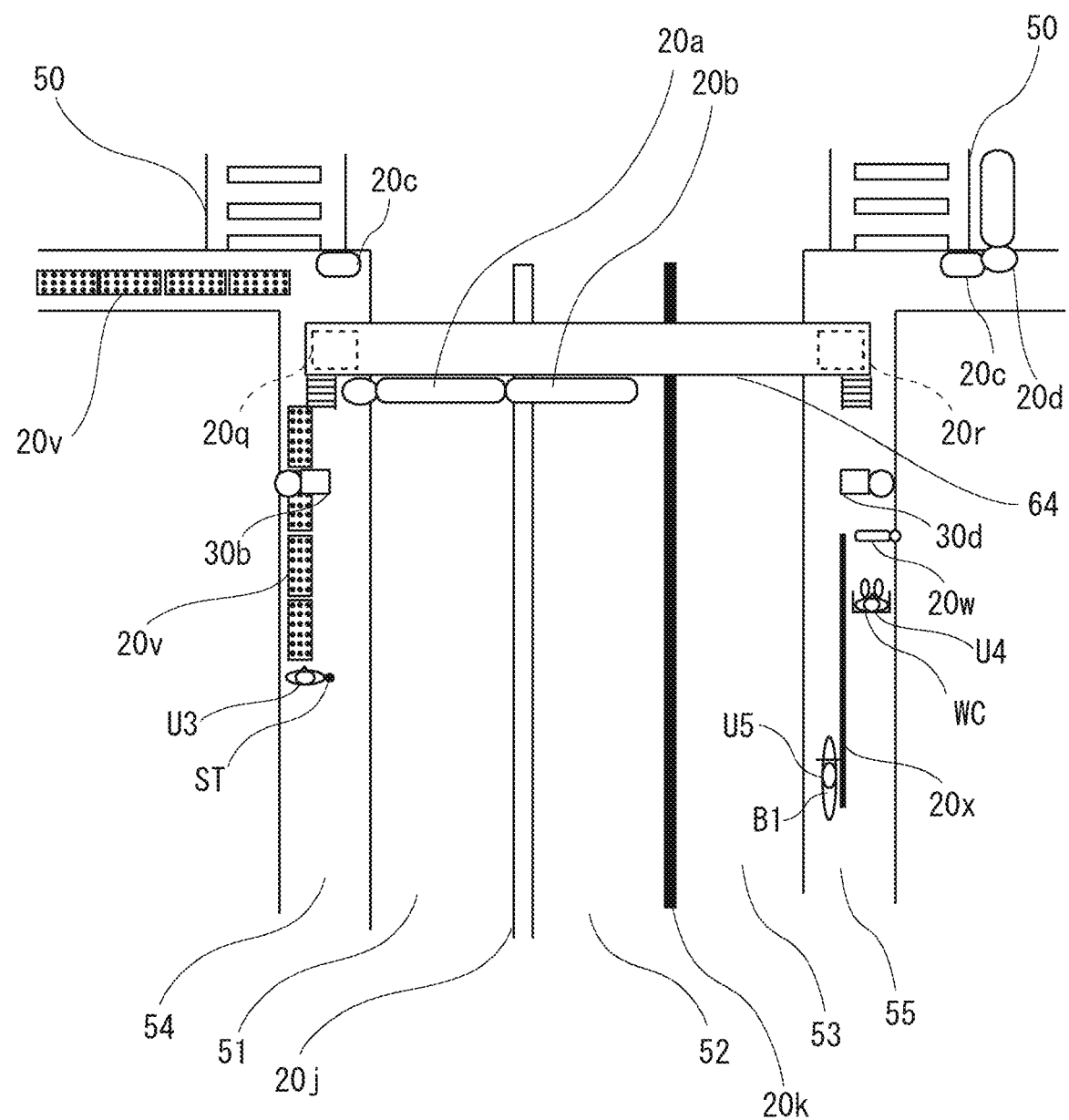
FIG. 6 is a schematic top view in which a part of the arrangement example of the traffic facilities of FIG. 4 is enlarged, and is a view illustrating a state where another person is detected in a region.

Before describing an example of such control in the traffic system 2 of FIG. 3, an arrangement example of the traffic facilities 20 to which the control can be applied will be described with reference to FIGS. 4 to 6. FIGS. 4 and 5 are schematic top views illustrating an arrangement example of the traffic facilities 20 in the traffic system 2 of FIG. 3, and FIG. 5 is a view illustrating a state in which some of the traffic facilities has transitioned to a state different from that of FIG. 4 by the control. FIG. 6 is a schematic top view in which a part of the arrangement example of the traffic facilities of FIG. 4 is enlarged, and is a view illustrating a state where another person is detected in a region. In FIG. 6, traffic facilities not illustrated in FIG. 4 are also illustrated.

In FIGS. 4 to 6, for convenience, only a part of a region in which the traffic facility 20 to be controlled by the traffic facility control apparatus 10 is arranged is illustrated as an example. However, the region in which the traffic facility 20 to be controlled is arranged is not limited to this example, and may include a region outside the illustrated region. Furthermore, as described above, the region in which the traffic facility 20 to be controlled is arranged can also be a region designated on a town basis, a district basis, a prefecture basis, or the like, for example.

A region in which some or all of the traffic facilities 20 to be controlled by the traffic facility control apparatus 10 are present can be, for example, a region including one main road and two small and medium roads as illustrated in FIGS. 4 to 6. In FIGS. 4 to 6, the main road is a road including lanes (roadways) 51 to 53 and sidewalks 54 and 55, the first small and medium road is a road including roadways 56 and 57 and sidewalks 58 and 59 and crossing the main road, and the second small and medium road is a road including roadways 60 and 61 and sidewalks 62 and 63 and forming a T-junction with the main road at the end of the main road.

In addition, in the region illustrated in FIGS. 4 to 6, two crosswalks 50 that cross the roadways 56 and 57 of the first small and medium road are provided, and pedestrian bridges 64 and 65 are provided in such a way as to be able to cross the roadways 51 to 53 of the main road by walking along the first small and medium road.

It is assumed that all the traffic facilities 20 to be controlled illustrated in FIGS. 4 to 6 are connected to the traffic facility control apparatus 10 via a network, and are controlled according to a control signal transmitted from the control unit 11.

As illustrated in FIGS. 4 to 6, examples of the traffic facility 20 to be controlled include traffic lights 20a, 20b, 20d, 20e, 20f, and 20g, crosswalk traffic lights 20c, lifting type strips 20j and 20k, a digital signage 20p, elevators 20q, 20r, 20s, and 20t, a lifting type braille block 20v, a variable sign 20w, and a lifting type guard rail 20x. For convenience, a traffic light for the roadway 53 is not illustrated, but it is assumed that the traffic light is arranged at an appropriate position.

It is a matter of course that the number and arrangement of the illustrated traffic facilities 20 are not limited thereto. In addition, the traffic facilities 20 to be controlled may be only a part of the illustrated traffic facility or may include other types of traffic facilities not illustrated.

The lifting type strips 20j and 20k each include a physical strip and a mechanism for lifting the strip, and it is possible to switch formation/non-formation of the strip by lifting the strip. Instead of the lifting type strips 20j and 20k, a configuration that enables switching between formation and non-formation of a strip by changing a display color can also be adopted.

For example, the lifting type strips 20j and 20k are controlled in such a way that the lifting type strips 20j and 20k are lifted in an opposite manner to make the main road a two-way road, and both the lifting type strips 20j and 20k are lowered to make the main road a one-way road. Hereinafter, in order to simplify the description, an example in which control is performed only in such a way as to make the main road a two-way road will be described.

As illustrated in FIG. 4, the lifting type strip 20j is lowered to a height substantially equal to surfaces of the roadways 51 and 52, so that it is possible to eliminate a partition between the roadways 51 and 52 to make them roadways in the same direction. In this case, an upper surface of the lifting type strip 20j may be colored in such a way as to be visually recognized as a white line, a white broken line, a yellow line, or the like of the road. In this state, the lifting type strip is lifted higher than the surfaces of the roadways 52 and 53 to a height at which the roadways 52 and 53 that are opposite lanes can be separated from each other, so that a physical partition can be formed between the roadways 52 and 53 to make them roadways in opposite directions.

On the other hand, as illustrated in FIG. 5, the lifting type strip is lifted higher than the surfaces of the roadways 51 and 52 to a height at which the roadways 51 and 52 that are opposite lanes can be separated from each other, so that a physical partition can be formed between the roadways 51 and 52 to make them roadways in opposite directions. In this state, the lifting type strip 20k is lowered to a height substantially the same height as the surfaces of the roadways 52 and 53, so that it is possible to eliminate a partition between the roadways 52 and 53 to make them roadways in the same direction. In this case, an upper surface of the lifting type strip 20k may be colored in such a way as to be visually recognized as a white line, a white broken line, a yellow line, or the like of the road.

Further, as another usage example, the lifting type strip 20j can change the roadway 51 to a sidewalk by being lifted higher than the surfaces of the roadways 51 and 52. In this case, the lifting type strip can also be lifted higher than the surfaces of the roadways 52 and 53, so that a physical partition is formed between the roadways 52 and 53 to make them roadways in opposite directions.

The traffic lights 20a and 20b may be controlled to be the same lighting color in synchronization in some cases and may be controlled to be different lighting colors in some cases. As illustrated in FIG. 4, in the former case, the lifting type strip 20j is lowered to substantially the same height as the surfaces of the roadways 51 and 52, and the lifting type strip 20k is lifted higher than the surfaces of the roadways 52 and 53. In the latter case, as illustrated in FIG. 5, the lifting type strip 20j is lifted higher than the surfaces of the roadways 51 and 52, and the lifting type strip 20k is lowered to substantially the same height as the surfaces of the roadways 52 and 53. The traffic light 20d is controlled in such a way that the traffic light 20d is red (green) when the traffic light 20a is green (red). Further, one of the traffic lights 20a and 20d is controlled to be yellow in some cases, and in this case, the other is controlled to be red.

The traffic lights 20e and 20f are also controlled similarly to the traffic lights 20a and 20b, respectively, but since there is a difference in installation positions, there may be a time difference in control between the traffic lights 20a and 20e and between the traffic lights 20b and 20f. That is, traffic lights 20e and 20f may be controlled to be the same lighting color in synchronization and may be controlled to be different lighting colors. In the former case, the lifting type strip 20j is lowered and the lifting type strip 20k is lifted, and in the latter case, the lifting type strip 20j is lifted and the lifting type strip 20k is lowered. The traffic light 20g is controlled in such a way that the traffic light 20g is red (green) when the traffic light 20e is green (red). Further, one of the traffic lights 20e and 20g is controlled to be yellow in some cases, and in this case, the other is controlled to be red.

Further, in a case where the lifting type strip 20k illustrated in FIG. 5 is lowered and the lifting type strip 20j is lifted, the traffic lights 20b and 20f can display a text or a mark notifying that passing is prohibited.

All of the four crosswalk traffic lights 20c are traffic lights visually recognized when a pedestrian or the like crosses the crosswalk, and can be controlled in synchronization. The crosswalk traffic light 20c is controlled to be green when the traffic light 20a is red, and is controlled to be red when traffic light 20a is green or yellow. It is a matter of course that the crosswalk traffic light 20c can also be controlled to blink green a predetermined time before the traffic light 20a changes from red to green. The control between the traffic light 20a and the crosswalk traffic light 20c is not limited to these controls, and it is sufficient that a timing to change the lighting color is set in consideration of safety.

The digital signage 20p is a display apparatus that displays contents of various notifications such as a notification for prompting safe driving and a notification to be described below for a vehicle traveling on the roadway 51 in a state where the lifting type strip 20j is lifted or the roadways 51 and 52 in a state where the lifting type strip 20j is lowered, and is installed on the sidewalk 54, a pole provided near a boundary between the sidewalk 54 and the roadway 51, or the like.

The lifting type braille block 20v is a movable braille block including a main body embedded in a place suitable for use by a person who uses a white cane on the sidewalk 54, a plurality of rod-shaped members forming braille, and a mechanism that lifts and lowers the plurality of rod-shaped members with respect to the main body. The lifting type braille block 20v is configured to form braille by simultaneously lifting the plurality of rod-shaped members that form the braille, and to remove the braille by lowering the plurality of rod-shaped members to be substantially flush with an upper surface of the sidewalk 54 (the braille is not formed). As described above, in the lifting type braille block 20v, formation and non-formation of braille can be switched by lifting and lowering the plurality of rod-shaped members.

The variable sign 20w is a display apparatus that displays a road sign selected from among a plurality of road signs for a person, and is installed, for example, on a pole or the like provided on the sidewalk 55 as illustrated in FIG. 6.

The lifting type guard rail 20x includes a physical protection fence and a mechanism for lifting the physical protection fence, and formation and non-formation of the protection fence can be switched by lifting and lowering the protection fence. As illustrated in FIG. 6, for example, the lifting type guard rail 20x can be installed in the vicinity of the center of the sidewalk 55 in a width direction in such a way that the lifting type guard rail 20x does not interfere with movement toward stairs of the pedestrian bridge 64 even when being lifted in a direction along the sidewalk 55. Instead of the lifting type guard rail 20x, a plurality of lifting type guard poles can also be used.

The elevators 20q and 20r are each an apparatus installed in the pedestrian bridge 64 and are each an apparatus that moves a person up and down between an upper sidewalk of the pedestrian bridge 64 and each of the sidewalks 54 and 55. The elevators 20s and 20t are each an apparatus installed in the pedestrian bridge 65 and are each an apparatus that moves a person up and down between an upper sidewalk of the pedestrian bridge 65 and each of the sidewalks 54 and 55.

Furthermore, as illustrated in FIGS. 4 to 6, the cameras 30b, 30d, and 30e corresponding to the camera 30 are installed on the sidewalks 54 and 55, etc., and the sensing zone 30a provided with sensors including the camera 30 is also installed at a point of the sidewalk 54 that corresponds to an entrance of the region. For example, the cameras 30b and 30c can be installed on poles provided on the sidewalk 54, and the cameras 30d and 30e can be installed on poles provided on the sidewalk 55. In the sensing zone 30a, the sensors and the like can be installed on an arch extending over both ends of the sidewalk 54, but the sensors and the like can also be installed on poles similarly to the camera 30b and the like.

In addition, FIGS. 4 to 6 illustrate a state in which persons U1, U1a, U2, U3, U4, and U5, a white cane ST used by the person U3, a wheelchair WC on which the person U4 is riding, a bicycle B1 on which the person U5 is riding, an automobile M1, and an autonomous mobile body M2 such as an autonomous bus exist in the illustrated region. However, since persons, automobiles, or the like are always moving, only a state of a moment is illustrated here. Here, the person U1a is an accompanying person of the person U1.

In the traffic system 2 of the above configuration example, a control example of the traffic facility 20 in accordance with detection of a person or the like will be described with reference to FIG. 7. Here, only one example of detection of a moving ability, determination of a psychological state, and control of the traffic facility 20 based on the detection and determination results will be described, but various examples can be applied. For the sake of convenience, as an example of control by the control unit 11, a case where control is performed in such a way that a certain state occurs in a case where a condition defined by a moving ability, a psychological state, or the like is satisfied will be described. However, if the certain state is the same as the current state, it means that control is not substantially performed, and if the certain state is different from the current state, it means that control is performed in such a way that the certain state occurs.

FIG. 7 is a diagram illustrating an example of a table used for controlling the traffic facilities 20 in the traffic system 2 of FIG. 3. In FIG. 7, for convenience, the reference signs in FIGS. 4 to 6 are used as facility IDs for identifying the traffic facilities 20, but the present disclosure is not limited thereto.

A table 12t illustrated in FIG. 7 can be stored in the storage unit 12, for example, and can be referred to by the control unit 11 at the time of control. The table 12t can also be stored as a part of the facility information DB 12a or the like.

First, the cases illustrated in FIGS. 4 and 5 will be described.

In FIG. 4, the control unit 11 detects the presence of a person based on imaging data captured by the camera 30b, and in a case where it is detected that the person U1a is an accompanying person of the person U1, the control unit 11 calculates the skeleton, a stride length, and a walking speed by inputting the imaging data to a learning model for skeleton recognition or the like, and calculates a walking ability of the person U1 based on these values. Here, the presence of a person can be detected by another sensor. In addition, the calculated walking ability of the person U1 is at a lower level than a walking ability detected in a case where there is no accompanying person for the person U1.

Furthermore, the control unit 11 detects a facial expression of the person U1 based on face image data included in the imaging data captured by the camera 30b, and determines a stress level of the person U1 based on the facial expression. In a configuration example in which it is necessary to identify a person in processing such as determination of a stress level, at this time, the control unit 11 may execute the face authentication processing based on the face image data captured by the camera 30b to identify the person U1.

In a case where a walking ability of the person U1 is lower than a predetermined ability level and the stress level of the person U1 is higher than a predetermined stress level (hereinafter, referred to as Condition A), the control unit 11 controls the traffic facility 20 as described below. In other cases, for example, the control unit 11 does not perform control of the traffic facility 20 according to the walking ability and the stress level, and can perform only control based on other factors (for example, the degree of congestion and the like) unrelated to the person U1. Condition A refers to Condition A illustrated in the table 12t of FIG. 7, and hereinafter, Conditions B to E also refer to Conditions B to E illustrated in the table 12t, respectively.

In a case where Condition A is satisfied, the control unit 11 can control, for example, the crosswalk traffic light 20c to turn green after a predetermined time in consideration of a time when the person U1 reaches the crosswalk 50, or to lengthen the green phase. Accordingly, the lighting color of the traffic light 20a is similarly controlled, and the lighting color of the traffic light 20d is controlled to be opposite to that of the traffic light 20a. The crosswalk traffic light 20c is a crosswalk traffic light within a range of a predetermined distance from the camera 30b, and although a description thereof is omitted, similarly, the traffic facility 20 to be controlled can be determined according to the position of the camera 30b and the position of each traffic facility 20.

In a case where Condition A is satisfied, the following additional control can be performed. That is, the control unit 11 can further perform control to lower the lifting type strip 20j and lift the lifting type strip 20k. As a result, for the sidewalk 54 on which the person U1 having a low walking ability and a high stress level is walking, the adjacent roadway is made to have two lanes including the roadways 51 and 52, so that it is possible to make the passage of vehicles comfortable. As a result, it is possible to improve the safety of the persons U1 and U1a who are pedestrians passing through the sidewalk 54 adjacent to the roadway.

Execution of such control can be determined depending on whether or not a traffic volume of vehicles such as the automobile M1, the autonomous mobile body M2, and the like is larger than a predetermined amount. In this case, the traffic volume can be calculated by analysis of imaging data captured by the cameras 30 installed at various places.

As an alternative example of the additional control, in a case where Condition A is satisfied, the control unit 11 can perform control to lift the lifting type strip 20j and also lift the lifting type strip 20k. In this case, the control unit 11 can also perform control in such a way that a change of the roadway 51 into a sidewalk is displayed on the traffic light 20a. As a result, the adjacent roadway 51 can be changed to a sidewalk for the sidewalk 54 on which the person U1 having a low walking ability and a high stress level is walking, so that the safety of the persons U1 and U1a can be improved.

Further, in a case where this alternative example is adopted, or for example, in a case where the lifting type strips 20j and 20k are not provided, although not illustrated, a lifting type strip, a lifting type guard rail, or the like is also provided between the original sidewalk 54 and the roadway 51, and in a case where Condition A is satisfied, the lifting type strip, the lifting type guard rail, or the like is lowered to add the roadway 51 as a sidewalk, and in a case where Condition A is not satisfied and the addition is not made, the lifting type strip, the lifting type guard rail, or the like is lifted. As a result, in a case where it is desired to improve safety of a pedestrian, it is possible to control the width of the sidewalk 54 to be increased by the width of the roadway 51 by lowering the lifting type strip or the like provided therebetween, and to control the width of the sidewalk in such a way that only the sidewalk 54 remains in other cases. Further, a configuration that enables switching between formation and non-formation of a boundary between the sidewalk and the roadway by changing a display color can also be adopted for the increase/decrease in width of the sidewalk 54 instead of using the lifting type strip or the like.

Even in a case where this alternative example is adopted, the execution of the control can be determined depending on whether or not a traffic volume of vehicles such as the automobile M1 and the autonomous mobile body M2 is larger than a predetermined amount. Furthermore, in a case where this alternative example is adopted, the control is not performed in a time zone in which the autonomous mobile body M2 passes through the roadway 51 as illustrated in FIG. 4, and in the time zone, a two-lane road including the roadways 51 and 52 as illustrated in FIG. 4 is formed. In a time zone in which the autonomous mobile body M2 does not pass, control is performed in such a way as to form a one-lane road as illustrated in FIG. 5.

In a case where Condition A is satisfied, as a further additional alternative example, the control unit 11 can control the digital signage 20p to make a notification of a control content of the traffic facility 20 other than a notification apparatus such as the digital signage 20p, for example, a control content of the traffic facility 20 in a predetermined region. As a result, it is possible to notify a person or a driver of a vehicle that the control content of the traffic facility 20 has changed.

As described above, the control unit 11 may control the notification apparatus provided as a part of the traffic facility 20 to make a notification according to a content of control for a facility other than the notification apparatus in the traffic facility. As a result, in the traffic facility control apparatus 10, the notification apparatus can notify a person of a control content of the traffic facility 20 other than the notification apparatus, so that the safety can be further improved. In addition, the notification can be made only under a specific condition such as Condition A. However, the notification can be made in any case under a condition where the traffic facility 20 is controlled.

The notification apparatus is not limited to the display apparatus such as the digital signage 20p, and examples thereof include a sound output apparatus and a display apparatus having a sound output function. The notification apparatus may be installed at a place where the control content affects a person, between the place and a place where the person is detected, or the like. In a case where a notification of the control content is made, such as a case where Condition A is satisfied, a notification for calling attention necessary in accordance with the control content, for example, a notification such as "Please move slowly" or "Please move quickly" may be made at the same time. On the other hand, in a case where a notification of the control content is not made, such as a case other than a case where Condition A is satisfied, the control unit 11 may control the notification apparatus to make a notification of a normal notification content such as a speed limit and "Stay within the speed limit".

In addition, a content notified by the notification apparatus at the time of controlling the traffic facility 20 can also be notified to a terminal apparatus used by the person U1 or the persons U1 and U1a by an instant message, an e-mail, or the like. The terminal apparatus can be a portable terminal apparatus or the like used by a person. In addition, since it is necessary to identify a person or a terminal apparatus used by a person for the notification, the traffic facility control apparatus 10 includes the identification unit.

Then, the traffic facility control apparatus 10 may include a notification unit that notifies a terminal apparatus used by a person (for example, the person U1 in this example) identified by the identification unit according to the content of control for the traffic facility 20. The notification content in this case may be, for example, only a schematic control content such as "such control will be performed", or can include personal information of the person identified by the identification unit, so that it is possible to reassure the person by making a notification that the traffic facility 20 is being controlled for the person as a target. In addition, after controlling the traffic facility 20 according to movement of the person, the traffic facility control apparatus 10 can also delete information indicating that the person is at the position or information other than the information necessary for the notification, and in this case, the notification content can include deletion of the information to reassure the person.

As described above, the traffic facility control apparatus 10 is configured to notify a terminal apparatus used by a person of a control content of the traffic facility 20 for the person, so that it is possible to reassure the person, thereby further improving safety.

In addition, the traffic facility control apparatus 10 may include an inquiry unit that inquires a terminal apparatus used by a person identified by the identification unit about whether or not to perform control of the traffic facility 20 based on a moving ability of the person and a psychological state of the person. The terminal apparatus can respond to the inquiry by incorporating an application program for responding to the inquiry. As a result, the traffic facility control apparatus 10 can determine whether or not to perform control of the traffic facility 20 in consideration of an intention of a person such as whether or not to enjoy a service of control of the traffic facility 20 based on his/her movement.

A timing of the inquiry may be before entering a control target region or may be, for example, the following timing. That is, when a person passes through the position of the sensor of the detection unit 1a such as the camera 30b, a moving ability and a psychological state of the person are obtained, but the terminal apparatus of the person may be inquired about whether or not the person desires to change the control of the traffic facility according to the moving ability and the psychological state of the person at that timing. At any timing, the control unit 11 receives the response and determines whether or not to change the control according to the response. As a result, it is possible to respect the intention of the person, and the person can recognize that the person is the target and be reassured.

In addition, in a case where the walking ability of the person U1 is lower than the predetermined ability level and the stress level of the person U1 is equal to or lower than the predetermined stress level (hereinafter, referred to as Condition B) among cases where Condition A is not satisfied, the control unit 11 can control the traffic facility 20 as described below.

In a case where Condition B is satisfied, since the person U1 does not feel irritated, it is assumed that there is no big problem even if the person U1 waits for the traffic light. Therefore, for example, the control unit 11 can control, for example, the crosswalk traffic light to turn red after a predetermined time considering a time taken for the person U1 to arrive at the crosswalk 50. Accordingly, the lighting color of the traffic light 20a is similarly controlled, and the lighting color of the traffic light 20d is controlled to be opposite to that of the traffic light 20a.

In a case where Condition B is satisfied, the control unit 11 can perform additional control opposite to that a case where Condition A is satisfied on a lifting type strip such as the lifting type strip 20j. Specifically, the control unit 11 can further perform control to lift the lifting type strip 20j and lower the lifting type strip 20k. However, in a case where Condition B is satisfied, for example, unlike a case where Condition A is satisfied, it is not necessary to determine execution depending on the traffic volume of vehicles, and it is sufficient if the example of the increase/decrease in width of the sidewalk and the example of the notification of the control content described as an alternative example of the additional control are not applied. On the other hand, also in a case where Condition B is satisfied, similarly to the further additional alternative example in a case of where Condition A is satisfied, the control unit 11 can control the digital signage 20p to make a notification of the control content of the traffic facility 20 other than the notification apparatus such as the digital signage 20p.

In addition, even in a case where the person U2 who is an elderly person is detected instead of the persons U1 and U1a, it is determined that the walking ability is lower than the predetermined ability level, and the control as in a case of Conditions A and B can be performed, but in this case, another control can be performed.

Next, a case illustrated in FIG. 6 will be described. In this case, the person U3 walks using the white cane ST, the person U4 moves on the wheelchair WC, and the person U5 travels on the bicycle B1. The person U3 is detected by the camera 30b, and the persons U4 and U5 are detected by the camera 30d.

Each of the white cane ST and the wheelchair WC can be detected as a kind of carried object that inhibits movement of the person U3 and the person U4, and for example, the walking abilities of the person U3 and the person U4 can be detected to be lower than predetermined ability levels (second and third predetermined ability levels) lower than the predetermined ability level. The second predetermined ability level can be set as a level higher than the third predetermined ability level or the like, but is not limited thereto. For example, the second predetermined ability level can be the same as the third predetermined ability level, and the fact that the white cane ST or the wheelchair WC is used can be added as information. On the contrary, the bicycle B1 can be detected as improving the moving ability of the person U5, and thus, the moving ability of the person U5 can be detected as a level considerably higher than the walking ability of a normal person, for example.

In a case where the walking ability of the person U3 detected by the camera 30b is lower than the second predetermined ability level and the stress level of the person U3 is higher than the predetermined stress level (Condition C), the control unit 11 controls the lifting type braille block 20v close to the camera 30b to lift the rod-shaped members, thereby causing the braille block to appear. At this time, the control unit 11 may perform the control described with Condition A at the same time.

As described above, in the control of the lifting type braille block 20v, the braille block may appear when the person U3 using the white cane ST is detected. In addition, control based on a condition different from Condition C can also be performed. For example, the lifting type braille block 20v may appear by default and may be retracted by lowering the bar-shaped members when a person carrying a suitcase is detected.

In a case where the walking ability of the person U4 detected by the camera 30d is lower than the third predetermined ability level and the stress level of the person U4 is higher than the predetermined stress level (hereinafter, referred to as Condition D), the control unit 11 performs control to display a mark, a text, or the like indicating that it is a wheelchair zone (a bicycle-traveling-prohibited zone) on the variable sign 20w close to the camera 30d. At this time, the control unit 11 may perform the control described with Condition A at the same time. However, since a moving direction of the person U4 is the same as that of the person U1 and the person U4 moves on the sidewalk 55 instead of the sidewalk 54, in short, the control of the lifting type strips 20j and 20k is opposite to that in a case where Condition A is satisfied.

In addition, also in a case where an elderly person is detected instead of or together with a wheelchair, it is possible to display a mark, a text, or the like indicating that it is a bicycle-traveling-prohibited zone on the variable sign 20w, and at the same time, it is possible to perform control to increase the road width of the sidewalk as described with Condition A.

Furthermore, as one of the traffic facilities 20, for example, a display apparatus that displays a crosswalk parallel to the pedestrian bridge 64 on a road surface may be provided, and when a wheelchair and/or an elderly person is detected, the crosswalk may be displayed by the display apparatus.

In a case where the walking ability of the person U5 detected by the camera 30d is at a level considerably higher than the walking ability of a normal person and the stress level of the person U5 is higher than the predetermined stress level (Condition E), the control unit 11 performs control to lift the lifting type guard rail 20x close to the camera 30d. As a result, a bicycle zone can be formed on the sidewalk 55, and the safety of other pedestrians can be improved. Further, in a case where the bicycle zone is formed, the fact that it is the bicycle zone may be displayed on a display apparatus similar to the variable sign 20w.

Conversely, the control unit 11 can also perform control to cause the lifting type guard rail 20x to appear when a person who uses a white cane or a person who is staggering is detected. That is, a condition corresponding to a case where a person who uses a white cane or a person whose is staggering is detected can also be included in Condition E.

In addition, even in a case where Condition D is satisfied, the control unit 11 can also perform control to lift the lifting type guard rail 20x for the purpose of protecting a person in a wheelchair or an elderly person or for the purpose of providing a handrail for an elderly person.

Hereinabove, the control example has been described by exemplifying the simple conditions as Conditions A to E, but the present disclosure is not limited thereto, and various application examples, in which, for example, control of the traffic facility 20 is performed based on detection of a camera 30 having a higher priority according to person detection states of the cameras 30, can be applied. In addition, a moving ability of a person is basically less likely to change during movement on a road, but a psychological state of a person may also change during movement. Therefore, for example, the control unit 11 can also perform control of the traffic facility 20 such as changing a timing at which a crosswalk traffic light 20c turns green and/or a length of a green phase of the crosswalk traffic light 20c based on a change in psychological state of a person, such as a change in psychological state before and at the time of reaching the crosswalk.

In addition, in the above description, the control of the traffic facility 20 is basically performed based on a moving ability and a psychological state of a person, and in some examples, a control example based on a traffic volume is described, but control based on other information can also be performed.

For example, the control of the traffic facility 20 can be changed based on an attention of a person to the surroundings. Such an attention varies, for example, in a situation in which the person views a portable terminal apparatus. Therefore, the traffic facility control apparatus 10 can include a viewing determination unit (not illustrated) that determines whether or not a person is viewing a portable terminal apparatus. Here, the portable terminal apparatus that is a termination target may be any apparatus, and for example, it is possible to determine whether or not the portable terminal apparatus is held by determining whether or not the portable terminal apparatus corresponds to one or a plurality of objects having a predetermined shape in the imaging data. Furthermore, in a case where there is a possibility that the person is looking at the portable terminal apparatus, for example, the face is directed to the portable terminal apparatus, it can be determined that the person is viewing the portable terminal apparatus. As can be seen from this example, the viewing determination unit can be implemented by, for example, the control unit 11 and information for determination stored in the storage unit 12.

Then, the control unit 11 may control a traffic facility based on a moving ability of a person, a psychological state of the person, and a determination result of the viewing determination unit. With such a configuration, the traffic facility control apparatus 10 can control the traffic facility 20 in consideration of whether or not a person is viewing a portable terminal apparatus, and can improve safety.

In addition, the traffic facility control apparatus 10 can include a prediction unit (not illustrated) that predicts a direction in which a person moves. A predicted target person can be a person who is a detection target of the detection unit 1a or a person who is a determination target of the determination unit 1b, but can also be a person identified by the identification unit.

The prediction unit can be implemented by, for example, the control unit 11 and information necessary for prediction stored in the storage unit 12. In this case, the control unit 11 can determine, for example, an orientation of the face (a direction of a line of sight) of a person and predict that the person moves in a direction matching the orientation of the face on map data stored in the storage unit 12. This is because a person may direct his/her gaze to a direction in which the person is to move next.

Alternatively, the prediction unit can be implemented by the control unit 11 and the communication unit 13. In the latter case, it is sufficient if the control unit 11 performs control to receive the prediction result from the portable terminal apparatus of the person via the communication unit 13. In this case, in a case where the person uses a navigation system incorporated in the portable terminal apparatus, the control unit 11 can acquire route information or destination information via the communication unit 13 and use the information as the prediction result.

Then, the control unit 11 controls the traffic facility 20 based on the predicted direction in which the person moves, the moving ability of the person, and the psychological state of the person. In particular, the control unit 11 can determine the traffic facility 20 to be controlled based on the predicted moving direction. For example, the control unit 11 controls the traffic facility 20 that is located near the current position of the person and in the direction in which the person moves based on the moving ability and the psychological state of the person. As a result, the traffic facility control apparatus 10 can control the traffic facility 20 in consideration of a result of predicting a direction in which a person moves. The control unit 11 controls a nearby traffic facility 20 based on, for example, a moving ability of a person having the lowest moving ability, and can thus eliminate an influence on others when controlling even a distant traffic facility 20.

An example of control in consideration of the prediction result will be described. For example, in a case where it is found that the users U1 and U1a are scheduled to move from the sidewalk 54 to the sidewalk 55 with reference to such a prediction result and Condition A is satisfied, the control unit 11 can perform the following control. That is, the control unit 11 may control the elevator 20q of the pedestrian bridge 64 to be lowered after a predetermined time considering a time taken to reach the elevator 20q and standby. In addition to such control, the control unit 11 may further perform control in such a way as to lift the elevator 20r after a predetermined time considering a time taken to reach the elevator 20r by walking through the pedestrian bridge 64 or the like. In addition, at the time of these controls, doors of the elevators 20q and 20r may be opened for a longer time.

The control of the elevators 20q and 20r can also be applied to a case where the prediction unit is not provided. That is, in a case where the control condition is satisfied, the control unit 11 can perform control to lower the elevator on a side close to the pedestrian in the pedestrian bridges 64 and 65, and can further perform control to lift the elevator on a side away from the pedestrian at the same time or slightly later. In addition, the control unit 11 can also perform control to open the door of the elevator for a longer time in a case where the control condition is satisfied. In particular, when the control condition includes a person having a low moving ability level such as a person using a cane (a white cane or a normal cane) or a wheelchair, such control can prevent a situation in which a person having a low moving ability level is sandwiched between the doors of the elevator.

As described above with reference to various examples, according to the present embodiment, it is possible to consider physical safety of a person and comfortable movement of a person, and to improve safety and comfort of a moving person. For example, as a traffic facility is controlled for a person having the lowest moving ability (in many cases, a person having a stress in movement), it is possible to provide beneficial control in terms of safety and comfort for a person having a low moving ability. It is a matter of course that a person having a high moving ability can also obtain a safety benefit by performing such control of a traffic facility. For example, the traffic facility control apparatus 10 can be configured to notify a person having a high moving ability that the traffic facility is controlled for the comfort of a person having a low moving ability by a notification or the like, for example. With such a configuration, even a person having a high moving ability can recognize that he/she is doing a good deed due to the notification, and thus, the degree of satisfaction in that respect can also be obtained.

In addition, as described with the example of the bicycle B1, the detection unit 1a of FIG. 1 can also detect a moving ability of a user of a mobile body as a person to be detected. That is, the moving ability of the person detected in this case refers to a moving ability in a case where the person moves using the mobile body. Here, in addition to the bicycle, various types of mobile bodies such as the autonomous mobile body M2, the automobile M1, and a motorcycle can be applied as the mobile body, and it does not matter whether or not the mobile body can autonomously move.

In this example, the control unit 11 can control, based on a moving ability of a person and a psychological state of the person, a traffic facility 20 installed at at least one of the vicinity of the current position of the mobile body, a position on a route along which the mobile body moves, and a position along the route. As a result, in the traffic facility control apparatus 10, even in a case where a person moves using a mobile body, it is possible to achieving both ensuring of physical safety of the person and reduction of a psychological burden on the person. In this example, the identification unit can transmit a necessary notification or the like to the mobile body by identifying the mobile body used by the person instead of or in addition to identifying the person.

For example, the control unit 11 can perform control to cause the communication unit 13 to transmit a notification for prompting a mobile body on which a person having a low moving ability is riding to move toward the center lane or a notification for prompting deceleration earlier than usual by using a road surface, a signboard, or the like. Furthermore, the control unit 11 can perform control to display a preferable route on a road, a signboard, or the like for a mobile body on which a person having a high stress level is riding.

Furthermore, the control unit 11 can also be configured to control an autonomous mobile body that autonomously travels on a route on which a traffic facility 20 is installed together with the traffic facility 20 based on a moving ability of a person and a psychological state of the person. For example, the control unit 11 not only controls the traffic facility 20 based on a moving ability, a psychological state, and the like of a person, but also optimally controls an autonomous mobile body that autonomously travels on a route on which the traffic facility 20 to be controlled is installed, together with the traffic facility 20.

More specifically, in a case where there is a person determined to have a low moving ability such as a person accompanied by a small baby or a person carrying a heavy backpack, or in a case where there is another person having a low moving ability, the control unit 11 can perform control to lower a speed upper limit of the autonomous mobile body. Here, for example, the upper limit of the speed can be lowered by tuning how the autonomous mobile body travels in automatic driving. Furthermore, the control unit 11 can also perform control to cause an autonomous mobile body on which a person having a low moving ability is riding to approach the center lane or perform control to decelerate earlier than usual by using a road surface, a signboard, or the like. Furthermore, the control unit 11 can also perform control to change a traveling route to a route with less curves in addition to or instead of lowering the upper limit of the speed. For example, the control unit 11 can perform control to set a preferable route such as a route with less curves for an autonomous mobile body on which a person having a high stress level is riding.

The control unit 11 can control any type of autonomous mobile body. However, for example, the control unit 11 can perform different control between a case where a certain person is riding a certain type of autonomous mobile body and a case where a certain person is riding another type of autonomous mobile body.

As described above, by expanding a range of the facility to be controlled to an autonomous mobile body used by a person, the traffic facility control apparatus 10 can move an autonomous mobile body in such a way as to provide a user of the autonomous mobile body with physical safety and satisfaction (comfort) in consideration of a moving ability of the user. Therefore, in such a traffic facility control apparatus 10, a user who uses an autonomous mobile body for the first time can also safely and comfortably receive a mobile service using the autonomous mobile body, and it is a matter of course that the user can also similarly receive the mobile service at the time of the next or subsequent use.

Figure 8:
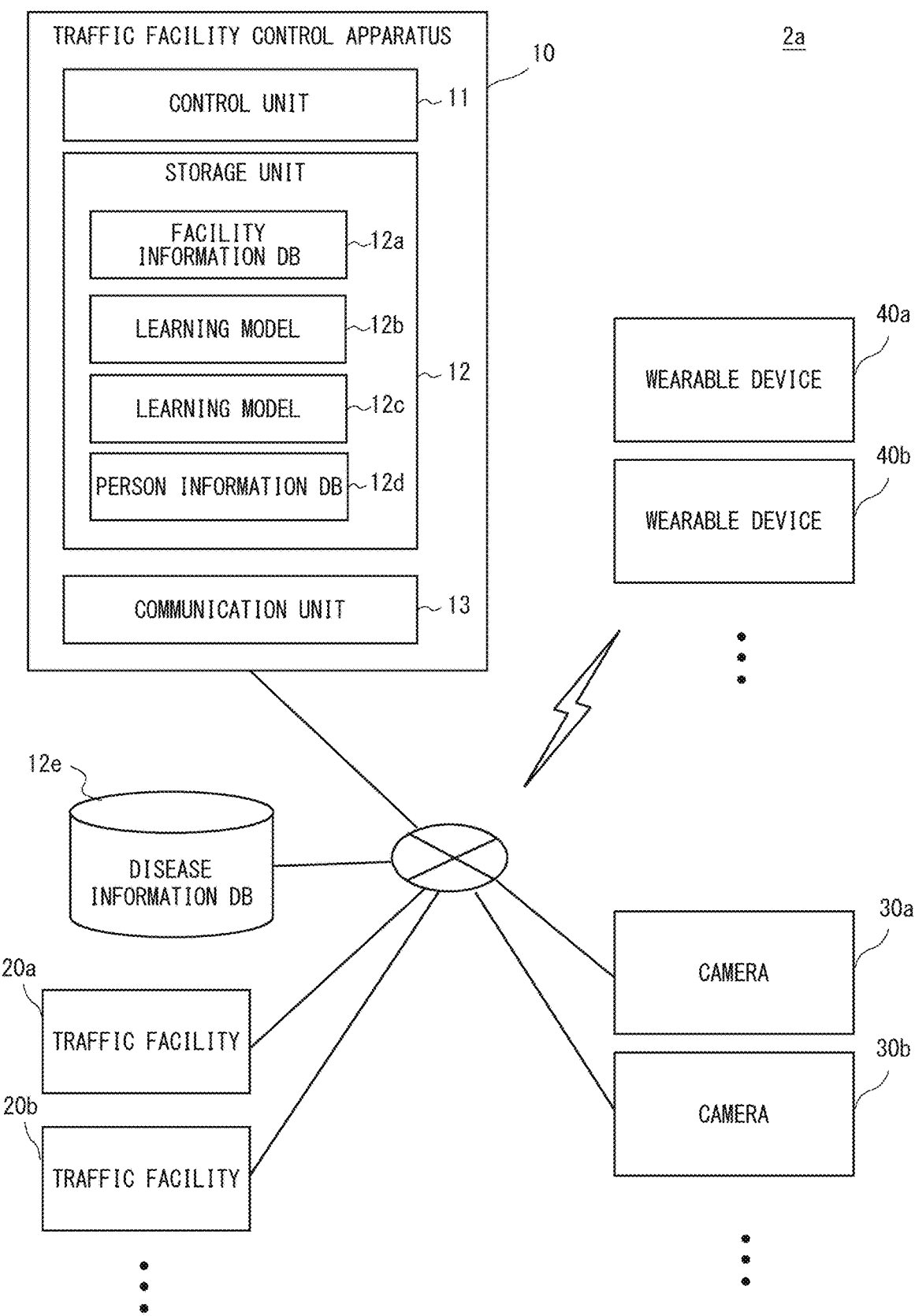
FIG. 8 is a block diagram illustrating another configuration example of the traffic system including the traffic facility control system of FIG. 1.

Next, an example of other information to be referred to at the time of controlling the traffic facility 20 will be described with reference to FIGS. 8 and 9. FIG. 8 is a block diagram illustrating another configuration example of a traffic system including the traffic facility control system 1 of FIG. 1, and FIG. 9 is a diagram illustrating an example of a table used for collecting information for controlling a traffic facility in the traffic system of FIG. 8.

A traffic system 2a illustrated in FIG. 8 is different from the traffic system 2 of FIG. 3 in that a disease information DB 12e which is a DB that stores disease information is included. The disease information DB 12e can be stored in an external server apparatus connected to the traffic facility control apparatus 10, and such an example will be described. However, the disease information DB 12e can be stored in the storage unit 12. For example, the disease information can be stored in the person information DB 12d in association with the individual identification information. The information stored as the disease information DB 12e can be appropriately kept up to date. The external server apparatus can be operated by, for example, a hospital or the like, but is not limited thereto.

In addition, the traffic facility control apparatus 10 illustrated in FIG. 8 can include an acquisition unit (referred to as a third acquisition unit for convenience) that acquires disease information indicating a disease related to a walking ability of a person identified by the identification unit. In the example of FIG. 8, the communication unit 13 and the control unit 11 that controls the acquisition are examples of the third acquisition unit.

Then, the control unit 11 controls the traffic facility 20 based on a moving ability of a person, a psychological state of the person, and disease information. For example, in a case where disease information of a detected person indicates paralysis of one leg, the control unit 11 controls the traffic facility 20 in a state where a level of a moving ability of the detected person is lowered by one level.

Therefore, the traffic facility control apparatus 10 illustrated in FIG. 8 can control the traffic facility 20 in consideration of disease information including a disease related to actual walking of a person, and can perform control more suitable for the state of the person.

Here, an example of acquisition of information by the control unit 11 will be additionally described with reference to the table of FIG. 9. First, the control unit 11 identifies a person from imaging data obtained by the camera 30. Then, the control unit 11 refers to the table illustrated in FIG. 9 to search for the learning model 12b, which is a moving ability model dedicated to the person, and the learning model 12c, which is a psychological state model dedicated to the person, and inputs necessary information such as the imaging data to each of the learning models to obtain a detection result and a determination result, respectively. In addition, the control unit 11 refers to the table illustrated in FIG. 9 to acquire disease information of the person.

The control unit 11 refers to the table 12t illustrated in FIG. 7 based on the detection result, the determination result, and the disease information collected in this manner, reads a traffic facility 20 to be controlled and a control content thereof, and controls the traffic facility 20.

The example of acquisition of the information described with reference to FIG. 9 can be similarly used for the traffic system 2 illustrated in FIG. 3 except for acquisition of the disease information. In addition, the example of acquisition of the disease information described with reference to FIG. 9 can also be applied to a method of acquiring information for identifying a person or a portable terminal apparatus or mobile body used by the person.

Figure 10:
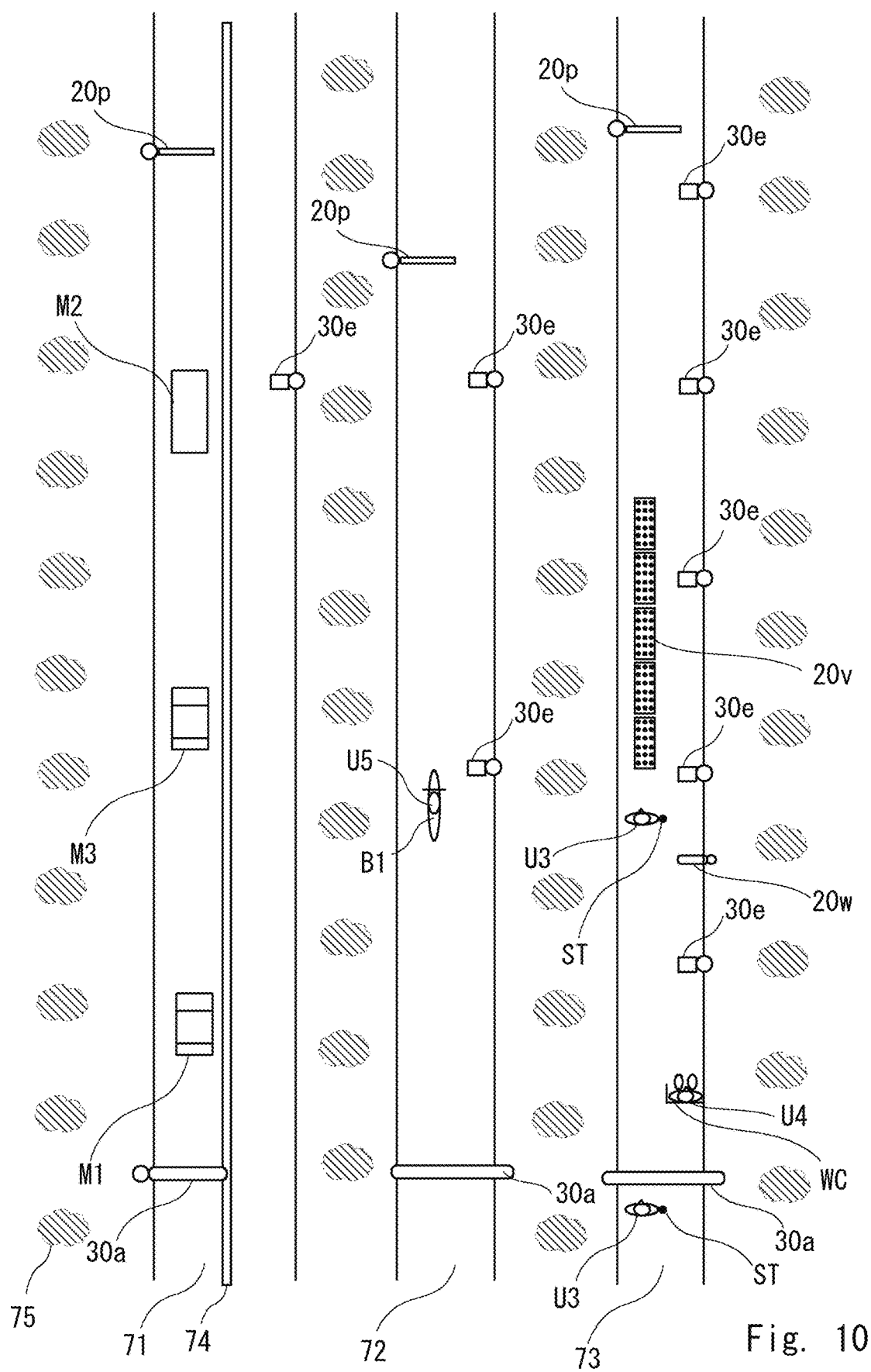
FIG. 10 is a schematic top view illustrating another arrangement example of the traffic facilities in the traffic system of FIG. 3 or 8.

Next, an arrangement example of the traffic facilities 20 different from FIGS. 4 to 6 will be described with reference to FIG. 10. FIG. 10 is a schematic top view illustrating another arrangement example of the traffic facilities 20 in the traffic system 2 of FIG. 3 or the traffic system 2a of FIG. 8.

As illustrated in FIG. 10, a part of a traffic network can also be a road group of which targets are determined, such as a road 71 for the exclusive use of automobiles and motorcycles, a road 72 for the exclusive use of bicycles, and a road 73 for the exclusive use of pedestrians. Here, the road 72 for the exclusive use of bicycles can be defined as, for example, an exclusive road on which a low-speed personal mobility travels or an exclusive road on which a bicycle and the personal mobility travel. Each of the roads 71 to 73 is illustrated as a straight line for convenience, but may include a curve or the like. Although the exclusive road 71 is illustrated as a two-lane road including an opposite lane, the exclusive road 71 may be a one-way road of one or more lanes, and a road that heads in the opposite direction and is similar to the exclusive road 71 in this case may be provided.

Also in the traffic network illustrated in FIG. 10, the sensing zone 30a and the cameras 30e are installed on the exclusive road 71, and as an example of the traffic facility 20, a lifting type strip 74 equivalent to the digital signage 20p and the lifting type strip 20j is installed. In addition, the sensing zone 30a and the cameras 30e are installed on the road 72 for the exclusive use of bicycles, and the digital signage 20p is installed as an example of the traffic facility 20. In addition, the sensing zone 30a and the cameras 30e are installed on the road 73 for the exclusive use of pedestrians, and the digital signage 20p, the lifting type braille block 20v, and the variable sign are installed as examples of the traffic facility 20. It is a matter of course that the installation intervals of the cameras 30e, the position of the sensing zone 30a, and the like are not limited and other types of traffic facilities 20 can be installed on each of the roads 71 to 73. In FIG. 10, trees 75 are planted beside each of the roads 71 to 73.

In such a configuration, the control unit 11 obtains the detection result, the determination result, and the like, and controls the traffic facility 20 based on the detection result, the determination result, and the like. As compared with the regions illustrated in FIGS. 4 to 6, the frequency of control is reduced as there is no intersection, but the control unit 11 controls the traffic facility 20 based on the detection result, the determination result, and the like as appropriate.

For example, in a case where the control unit 11 detects that the autonomous mobile body M2 on which a person having a low walking ability and a high stress level is riding is traveling on the exclusive road 71, the control unit 11 can perform control to lower the upper limit of the speed of the autonomous mobile body M2 and perform control to display the fact on the digital signage 20p, thereby notifying the other automobiles M1 and M2.

Furthermore, for example, in a case where the control unit 11 detects the bicycle B1 on which the person U5 having a low walking ability and a high stress level is riding on the road 72 for the exclusive use of bicycles, the control unit 11 performs control to display a notification for calling attention on the digital signage 20p.

Furthermore, for example, in a case where the control unit 11 detects a person having a low walking ability and a high stress level, such as the person U4 using the wheelchair WC or the person U3 using the white cane ST, on the road 73 for the exclusive use of pedestrians, the control unit 11 performs control to display a notification for notifying another person that there is a person using a wheelchair or white cane on the variable sign 20w or the digital signage 20p. Furthermore, in a case where the control unit 11 detects a person having a low walking ability like the person U3 using the white cane ST and having a high stress level or a person having a walking ability equivalent to the person U3 using the white cane ST regardless of the stress level, the control unit 11 controls the lifting type braille block 20v to lift the bar-shaped members to make the braille block appear.

In addition, for example, other mobile bodies may enter a road for the exclusive use of automobiles, a road for the exclusive use of motorcycles, a road for the exclusive use of automobiles and motorcycles, a road for the exclusive use of bicycles, a road for the exclusive use of pedestrians, and the like. For example, a pedestrian may enter a road for the exclusive use of automobiles, or a vehicle may enter a road for the exclusive use of pedestrians. Therefore, even in a case where such a person or vehicle not suitable for use of the exclusive road enters, the control unit 11 may control another type of traffic facility 20 in such a way as to display a warning on the notification apparatus or to prevent the pedestrian from being injured based on the detection result, the determination result, and the like.

Figure 11:
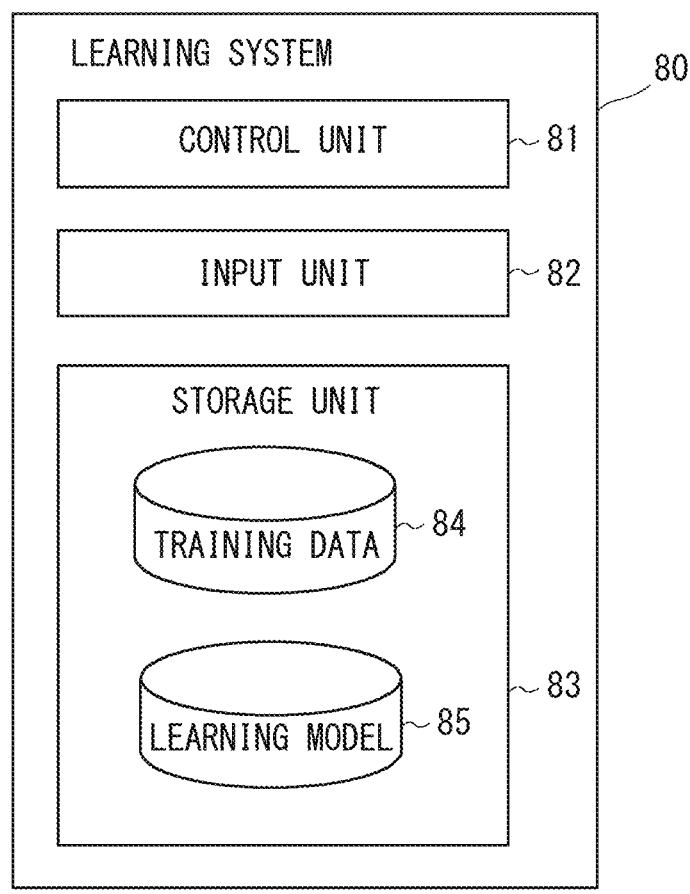
FIG. 11 is a block diagram illustrating a configuration example of a learning system that generates a learning model used in the traffic system of FIG. 3 or 8.

Finally, a configuration example of a learning system that generates the above-described various learning models will be described with reference to FIGS. 11 to 13. FIG. 11 is a block diagram illustrating a configuration example of the learning system that generates the learning model used in the traffic system 2 of FIG. 3 or the traffic system 2a of FIG. 8. FIG. 12 is a diagram illustrating an example of training data used in the learning system of FIG. 11, and FIG. 13 is a diagram illustrating another example of the training data used in the learning system of FIG. 11.

A learning system 80 illustrated in FIG. 11 can include a control unit 81, an input unit 82, and a storage unit 83. The learning system 80 can be constructed using, for example, a computer such as an artificial intelligence (AI) training PC. However, the learning system 80 may be implemented by a single apparatus or may be implemented by distributing functions to a plurality of apparatuses.

The control unit 81 controls the entire learning system 80. The control unit 81 can be implemented by, for example, an integrated circuit, and can be implemented by, for example, a processor, a work memory, a nonvolatile storage apparatus, and the like. A control program executed by the processor is stored in the storage apparatus, and the processor reads the program to the work memory and executes the program, so that the function of the control unit 81 can be performed. The control program can include a training program for executing training. As the storage apparatus, the storage unit 83 can also be used.

The input unit 82 can include at least one of an interface for performing a data input operation or a communication interface for inputting data from an external apparatus by communication. The input unit 82 inputs a data set of the training data 84 necessary for training, and stores the data set in the storage unit 83 so that the data set can be referred to during training. The storage unit 83 can store the training data 84 and can store a learning model 85 as an untrained model.

In the processing performed by the learning system 80, it is sufficient if the control unit 81 causes the learning model 85 as an untrained model to perform machine learning based on the training data 84, thereby training the learning model 85 to be a trained model. Furthermore, in a case where retraining is necessary, the learning model 85 as a trained model can be retrained based on a newly prepared data set.

The training data 84 in a case of generating the learning model 12b can be a data set including the imaging data and the ground truth data as described above, but can also be a data set as illustrated in FIG. 12, for example. The data set illustrated in FIG. 12 includes, as explanatory variables, movable range information that is information obtained by detecting a movable range of a person, and walking speed information that is information obtained by calculating a walking speed of a person. In addition, the data set illustrated in FIG. 12 includes, as an objective variable, a value of a level indicating a moving ability, the value being obtained from the person himself/herself or determined by a doctor or the like. Here, an example in which a moving ability is expressed at three levels of high, normal, and low is illustrated, but the present disclosure is not limited thereto.

The training data 84 in a case of generating the learning model 12c can be a data set including at least one of the vital information or the imaging data and the ground truth data as described above, and can be, for example, a data set as illustrated in FIG. 13. The data set illustrated in FIG. 13 includes, as explanatory variables, pulse rate information and body temperature information which are part of the vital information and includes, as an objective variable, a level indicating a psychological state. The level includes a value obtained from the person himself/herself or the like. Here, an example in which a psychological state is expressed at three levels of good, normal, and bad is illustrated, but the present disclosure is not limited thereto.

Also in a case of generating the learning model 12c and a learning model obtained by integrating the learning models 12b and 12c, a similar learning system can be used only with a difference in the algorithm, the training data, and the like. In this case, the training data 84 can be, for example, data obtained by combining the data sets schematically illustrated in FIGS. 12 and 13. Furthermore, even in a case where another learning model is generated, a similar learning system can be used only with a difference in the algorithm, the training data, and the like.

<Other Embodiments>

The traffic facility control system according to the embodiment described above is not limited to the configuration example described above and is not limited to the configuration for executing the control example described above as long as the functions may be implemented.

Figure 14:
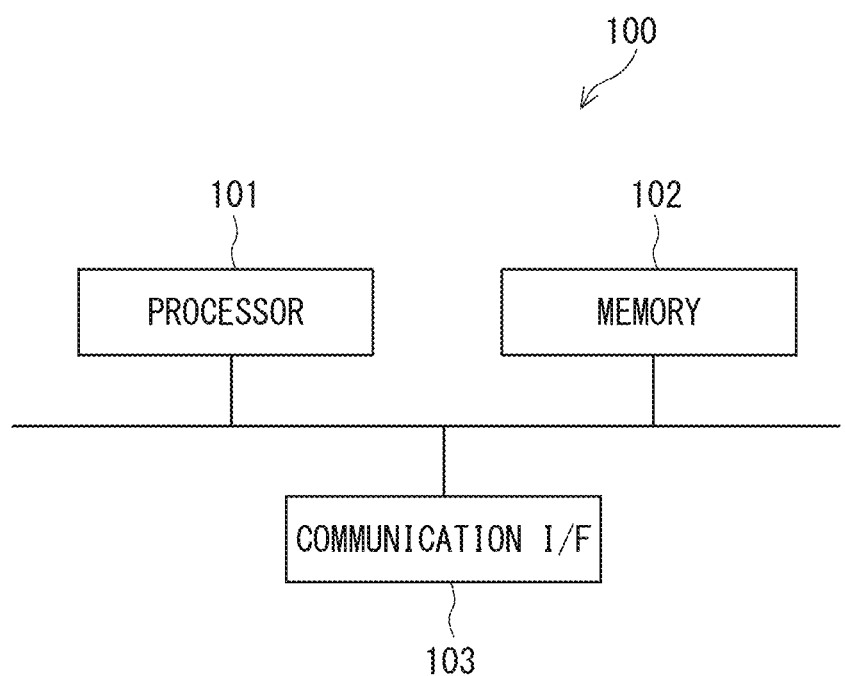
FIG. 14 is a diagram illustrating an example of a hardware configuration included in an apparatus.

In addition, each apparatus included in the traffic facility control system described in the above embodiment can have the following hardware configuration. FIG. 14 is a diagram illustrating an example of a hardware configuration included in the apparatus.

An apparatus 100 illustrated in FIG. 14 is each apparatus in the traffic facility control system according to the above embodiment, and includes a processor 101, a memory 102, and a communication interface (I/F) 103. The processor 101 may be, for example, a CPU, a graphics processing unit (GPU), a micro processor unit (MPU) which is also referred to as a microprocessor, or the like. The processor 101 may include a plurality of processors.

The function of each unit in each apparatus can be implemented by the processor 101 reading a program stored in the memory 102 and executing the program in cooperation with the communication I/F 103. Note that at least one of a wireless communication I/F or a wired communication I/F is provided in the communication I/F 103 in some apparatuses. In addition, each apparatus can include, for example, an I/F for a sensor, an input/output apparatus, or the like necessary for the apparatus.

The program includes instructions (or software codes) that, when loaded into a computer, cause the computer to perform one or more of the functions described in the embodiments. The program may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disc (DVD), Blu-ray disc or other optical disc storage, magnetic cassettes, magnetic tape, magnetic disk storage or other magnetic storage devices. The program may be transmitted on a transitory computer readable medium or a communication medium. By way of example, and not limitation, transitory computer readable media or communication media can include electrical, optical, acoustical, or other form of propagated signals.

According to the present disclosure, it is possible to provide a traffic facility control system, a traffic facility control method, and a program capable of achieving both ensuring of physical safety of a moving person and reduction of a psychological burden on the moving person.

Note that the present disclosure is not limited to the above embodiment, and can be appropriately changed without departing from the gist. In addition, the present disclosure includes an appropriate combination of the examples in the above embodiment.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A traffic facility control system comprising:
a detection unit configured to detect a moving ability of a person, wherein the detection unit is configured to detect the moving ability of the person based on at least one of a speed of the person or a magnitude of movement of a limb of the person;
a determination unit configured to determine a psychological state of the person; and
a control unit configured to control a first traffic facility, wherein an installation location of the first traffic facility is at least one of a vicinity of a current position of the person, a position on a route along which the person moves, or a position along the route, the control of the first traffic facility is based on the moving ability of the person and the psychological state of the person, and the control unit is configured to control the first traffic facility to:
facilitate movement of the person along the route, and
a duration of the control of the first traffic facility is increased as the moving ability of the person decreases.

2. The traffic facility control system according to claim 1, wherein the detection unit detects at least a walking ability of the person as the moving ability of the person.

3. The traffic facility control system according to claim 1, wherein the detection unit detects the moving ability of the person by detecting a presence or absence of a carried object or an accompanying person that hinders movement of the person, and calculating the moving ability of the person based on a result of the detecting.

4. The traffic facility control system according to claim 1, wherein the control unit controls at least one of a change timing or a duration of a changed state for at least one of a change in display or a change in shape of the first traffic facility.

5. The traffic facility control system according to claim 1, further comprising:
an identification unit configured to identify the person; and
a third acquisition unit configured to acquire disease information indicating a disease related to the walking ability of the person identified by the identification unit,
wherein the control unit controls the first traffic facility based on the moving ability of the person, the psychological state of the person, and the disease information.

6. The traffic facility control system according to claim 1, further comprising a prediction unit configured to predict a direction in which the person moves,
wherein the control unit controls the first traffic facility based on the predicted direction in which the person moves, the moving ability of the person, and the psychological state of the person.

7. The traffic facility control system according to claim 1, further comprising a viewing determination unit configured to determine whether or not the person is viewing a portable terminal apparatus,
wherein the control unit controls the first traffic facility based on the moving ability of the person, the psychological state of the person, and a determination result obtained by the viewing determination unit.

8. The traffic facility control system according to claim 1, wherein the control unit controls a notification apparatus provided as a part of the first traffic facility to make a notification according to a content of control for a facility other than the notification apparatus in the first traffic facility.

9. The traffic facility control system according to claim 1, further comprising:
an identification unit configured to identify the person; and
a notification unit configured to notify a terminal apparatus used by the person identified by the identification unit of a content of control for the first traffic facility.

10. The traffic facility control system according to claim 1, further comprising:
an identification unit configured to identify the person; and
an inquiry unit configured to inquire a terminal apparatus used by the person identified by the identification unit about whether or not to perform control of the first traffic facility based on the moving ability of the person and the psychological state of the person.

11. The traffic facility control system according to claim 1, wherein the detection unit detects a moving ability of a user of a mobile body as a person to be detected, and
the control unit controls a second traffic facility, wherein an installation location of the second traffic facility is at least one of a vicinity of a current position of the mobile body, a position on a route along which the mobile body moves, or a position along the route based on the moving ability of the person and the psychological state of the person.

12. The traffic facility control system according to claim 1, wherein the detection unit is configured to detect the moving ability of the person by:
detecting a skeleton of the person during movement of the person; and
analyzing the detected skeleton using a learning model.

13. The traffic facility control system according to claim 1, further comprising a first acquisition unit configured to acquire vital information of the person measured by a measuring instrument worn by the person,
wherein the determination unit determines the psychological state of the person based on the vital information.

14. The traffic facility control system according to claim 13, further comprising an identification unit configured to identify the person,
wherein the determination unit determines the psychological state of the person based on the vital information by using a learning model trained by machine learning for the person identified by the identification unit.

15. The traffic facility control system according to claim 1, further comprising a second acquisition unit configured to acquire imaging data obtained by capturing a face image of the person,
wherein the determination unit determines the psychological state of the person based on the imaging data.

16. The traffic facility control system according to claim 15, further comprising an identification unit configured to identify the person, wherein the determination unit determines the psychological state of the person based on the imaging data by using a learning model trained by machine learning for the person identified by the identification unit.

17. A traffic facility control method comprising:
detecting a moving ability of a person based on at least one of a speed of the person or a magnitude of movement of a limb of the person;
inputting a result of the detecting the moving ability of the person;
inputting a result of determining a psychological state of the person; and
controlling a traffic facility, wherein an installation location of the traffic facility is at least one of a vicinity of a current position of the person, a position on a route along which the person moves, or a position along the route, and the controlling is based on the moving ability of the person and the psychological state of the person, wherein controlling the traffic facility comprises:
facilitating movement of the person along the route, and
increasing a duration of the control of the first traffic facility as the moving ability of the person decreases.

18. A non-transitory computer readable medium storing a program for causing a computer to execute:
detecting a moving ability of a person based on at least one of a speed of the person or a magnitude of movement of a limb of the person;
inputting a result of the detecting the moving ability of the person;
inputting a result of determining a psychological state of the person; and
controlling a traffic facility, wherein an installation location of the traffic facility is at least one of a vicinity of a current position of the person, a position on a route along which the person moves, or a position along the route, and the controlling is based on the moving ability of the person and the psychological state of the person, wherein controlling the traffic facility comprises:
facilitating movement of the person along the route, and
increasing a duration of the control of the first traffic facility as the moving ability of the person decreases.

19. The traffic facility control method according to claim 17, wherein detecting the moving ability of the person comprises:
detecting a skeleton of the person during movement of the person; and
analyzing the detected skeleton using a learning model.

20. The non-transitory computer readable medium according to claim 18, wherein detecting the moving ability of the person comprises:
detecting a skeleton of the person during movement of the person; and
analyzing the detected skeleton using a learning model.

* * * * *